United States Patent
Ogasahara et al.

(10) Patent No.: US 8,401,008 B2
(45) Date of Patent: Mar. 19, 2013

(54) NETWORK NODE, FRAME TRANSFER PROGRAM AND FRAME TRANSFER METHOD

(75) Inventors: Daisku Ogasahara, Tokyo (JP); Masahiro Sakauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 12/162,074

(22) PCT Filed: Jan. 23, 2007

(86) PCT No.: PCT/JP2007/051332
§ 371 (c)(1),
(2), (4) Date: Jul. 24, 2008

(87) PCT Pub. No.: WO2007/086539
PCT Pub. Date: Aug. 2, 2007

(65) Prior Publication Data
US 2009/0185566 A1    Jul. 23, 2009

(30) Foreign Application Priority Data
Jan. 25, 2006   (JP) ................................ 2006-016629

(51) Int. Cl.
H04L 12/28    (2006.01)

(52) U.S. Cl. ........................................ 370/389; 370/254

(58) Field of Classification Search .................. 370/389; 714/7, 21
See application file for complete search history.

(56) References Cited

U.S. PATENT DOCUMENTS

| | | | |
|---|---|---|---|
| 6,934,263 B1 * | 8/2005 | Seaman | 370/256 |
| 2001/0005370 A1 * | 6/2001 | Ueno | 370/393 |

FOREIGN PATENT DOCUMENTS

| | | |
|---|---|---|
| JP | 1-181255 | 7/1989 |
| JP | 2003-244185 | 8/2003 |
| JP | 2005-130408 | 5/2005 |
| WO | WO-2005-036831 | 4/2005 |

OTHER PUBLICATIONS

IEEE Standard for Information technology—Telecommunications and information exchange beween systems—Local and metropolitan area networks—Common specifications Part 3: Media Access Control (MAC) Bridges, Adopted by the ISO/IEC and redesignated as ISO/IEC 15802-3:1998, ANSI/IEEE Std 802.1D, 1998 Edition.

* cited by examiner

Primary Examiner — Kevin C Harper
Assistant Examiner — Henry Baron
(74) Attorney, Agent, or Firm — Dickstein Shapiro LLP

(57) ABSTRACT

A network node including an FDB for registering a relationship between a destination MAC address and a port label, an input port table for registering a relationship between an input port and a port label, and a port label table for registering a relationship between a port label and an output port, at the reception of a frame, registers a relationship between a transmission source MAC address of a frame and a port label registered for an input port in the input port table at the FDB, at the time of transmission of a frame, transmits the frame to an output port registered at the port label table which port corresponds to a port label registered for the destination MAC address in the FDB and at the time of processing of flushing or updating the FDB unit, changes the contents of the input port table and the port label table.

39 Claims, 22 Drawing Sheets

○ : FORWARDING STATE OF STP
× : BLOCKED STATE OF STP

○: FORWARDING STATE OF STP
×: BLOCKED STATE OF STP

| DESTINATION MAC ADDRESS | OUTPUT PORT |
|---|---|
| MAC ADDRESS OF Ethernet NODE 300 | P3 |
| MAC ADDRESS OF Ethernet NODE 310 | P1 |
| MAC ADDRESS OF Ethernet NODE 320 | P2 |

| INPUT PORT | PORT LABEL |
|---|---|
| P1 | α |
| P2 | β |
| P3 | γ |

| DESTINATION MAC ADDRESS | PORT LABEL |
|---|---|
| MAC ADDRESS OF Ethernet NODE 300 | γ |
| MAC ADDRESS OF Ethernet NODE 310 | α |
| MAC ADDRESS OF Ethernet NODE 320 | β |

| PORT LABEL | OUTPUT PORT |
|---|---|
| α | P1 |
| β | P2 |
| γ | P3 |

○ : FORWARDING STATE OF NODE REDUNDANCY PROTOCOL
× : BLOCKED STATE OF NODE REDUNDANCY PROTOCOL

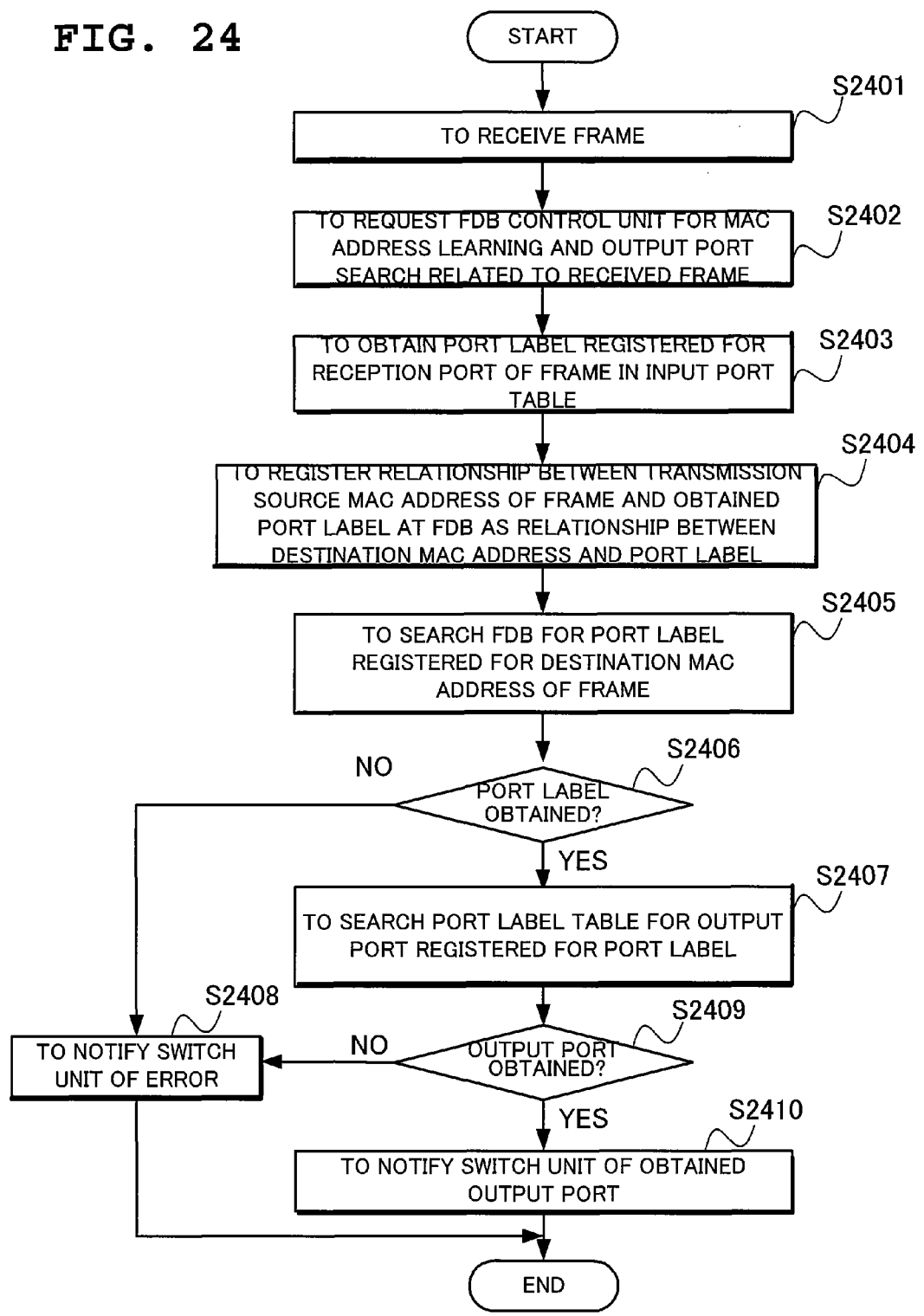

○ : FORWARDING STATE OF NODE REDUNDANCY PROTOCOL
× : BLOCKED STATE OF NODE REDUNDANCY PROTOCOL

FIG. 36

| RPR NODE ADDRESS | ADDRESS LABEL |
|---|---|
| A | $\alpha$ |
| B | $\beta$ |
| C | $\gamma$ |
| D | $\delta$ |

FIG. 37

| ADDRESS LABEL | DESTINATION RPR NODE ADDRESS |
|---|---|
| $\alpha$ | A |
| $\beta$ | B |
| $\gamma$ | C |
| $\delta$ | D |

NETWORK NODE, FRAME TRANSFER PROGRAM AND FRAME TRANSFER METHOD

TECHNICAL FIELD

The present invention relates to transfer of a frame on a network and, more particularly, to highly reliable network node, frame transfer program and frame transfer method.

BACKGROUND ART

In recent years, as can been seen in wide area Ethernet (registered trademark) services, Ethernet (registered trademark) has been adopted for a trunk system communication system.

Among the reasons, in addition to low-cost of a node operable conformed to Ethernet (registered trademark) (hereinafter, referred to as an Ethernet (registered trademark) node) on such a device as SONET according to related art, is that the system is easy to handle.

On the other hand, in terms of reliability, Ethernet (registered trademark) developed for LAN (Local Area Network) fails to sufficiently satisfy performance required of a trunk system communication system.

Such protocol as Spanning Tree Protocol (STP) or Rapid Spanning Tree Protocol (RSTP) which allows redundancy of a communication path has been standardized by IEEE (the Institute of Electrical and Electronics Engineers), while protocol which duplexes an Ethernet (registered trademark) node has been uniquely developed by a device vender, so that reliability of an Ethernet (registered trademark) network has been improved to lead to application to a trunk system communication system today.

In the following, for clarifying necessity of the present invention, description will be made of Ethernet (registered trademark) frame transfer operation at a normal state and failure recovery operation when abnormality occurs such as link cut-of or a failure of an Ethernet (registered trademark) node in an Ethernet (registered trademark) network to which applied is STP which is disclosed in IEEE 802.1D (Non-patent Literature 1) as the standardization document issued in 1998 by IEEE.

(Structure of Communication System)

Communication system shown in FIG. 1 is an Ethernet (registered trademark) network formed of three Ethernet (registered trademark) nodes 100~120 operable conformed to STP (hereinafter referred to as an STP node) and three Ethernet (registered trademark) nodes 300~320.

The Ethernet (registered trademark) nodes 300~320 are accommodated in the STP nodes 100~120, respectively, as terminals under the control of the STP nodes 100~120.

Although a plurality of Ethernet (registered trademark) nodes can be accommodated under the STP nodes 100~120, for the simplification of the description, it is assumed here that the STP nodes 100~120 each accommodate one Ethernet (registered trademark) node.

Such a structure can be used as well in which further under the Ethernet (registered trademark) nodes 300~320, other Ethernet (registered trademark) node is connected unless a loop is formed.

Assume that ports P1 and P2 of the STP nodes 100~120 are set to be ports which are to be controlled by STP and that setting a port state of these ports to be either a forwarding state (O in FIG. 1) or a blocked state (x in FIG. 1) as shown in FIG. 1 by the operation of STP among the STP nodes 100~120 results in forming a spanning tree indicated by a heavy line in FIG. 1.

Since a process of determining a port state of a port to be controlled under STP by the STP nodes 100~120 by STP, that is, a process of forming a spanning tree is not closely related to the present invention, no detailed description will be made thereof.

Ports at the opposite ends of a link included in the spanning tree is at a state where data frame transmission/reception is allowed (forwarding state) and one port of a link not included in the spanning tree is at the forwarding state, while the other port is at a state where data frame transmission/reception is inhibited (blocked state), that is, the link is logically cut off.

Since a frame is transmitted/received to/from a port in the forwarding state, in an Ethernet (registered trademark) network to which STP is applied, the frame will be transferred along the spanning tree.

(Structure of Node)

FIG. 3 is a diagram showing a structure of the above-described STP node 100.

Structure of the STP nodes 110 and 120 is the same as that of the STP node 100.

With reference to FIG. 3, the STP node 100 is formed of input ports 400-1~400-3, frame analysis units 410-1 and 410-2, a switch unit 420, frame multiplexing units 430-1 and 430-2, output ports 440-1~440-3, an FDB (Forwarding Data Base) unit 450, an FDB control unit 460, an FDB 470, an STP unit 500 and a port state table 510.

The input ports 400-1~400-3 of the STP node 100 are ports for receiving a frame transmitted from the adjacent Ethernet (registered trademark) node 300 or STP node 110 or STP node 120, which are equivalent to reception units of P1~P3 of the STP node 100 shown in FIG. 1.

In the following, denotation of the input port P1 of the STP node 100 is assumed to represent the input port 400-1 of the STP node 100.

The frame analysis units 410-1 and 410-2 of the STP node 100 send a BPDU (Bridge Protocol Data Unit) as a special frame for use by the STP unit 500 of the STP node 100 to the STP unit 500 of the STP node 100 and sends other frames than BPDU to the switch unit 420 of the STP node 100.

The switch unit 420 of the STP node 100 determines an output port of a received frame, as well as sending the frame to an appropriate function block among the frame multiplexing units 430-1 and 430-2 and the output port 440-3 of the STP node 100 according to the determination.

After multiplexing a frame sent from the switch unit 420 of the STP node 100 and a BPDU sent from the STP unit 500 of the STP node 100, the frame multiplexing units 430-1 and 430-2 of the STP node 100 send the obtained frame to the output ports 440-1 and 440-2 of the STP node 100.

The output ports 440-1~440-3 of the STP node 100 are ports for transmitting a frame to the adjacent STP node 110 or 120 or Ethernet (registered trademark) node 300, which are equivalent to transmission units of P1~P3 of the STP node 100 shown in FIG. 1.

In the following, denotation of the output port P1 of the STP node 100 is assumed to represent the output port 440-1 of the STP node 100.

The FDB unit 450 of the STP node 100 is formed of the FDB 470 for registering a relationship between a destination MAC address of a frame and an output port, and the FDB control unit 460 for searching and updating the contents of the FDB 470.

FIG. 4 is an example of the FDB 470 of the STP node 100.

For example, registered in the first entry of the FDB 470 of the STP node 100 shown in FIG. 4 is the port P3 of the STP node 100 corresponding to a MAC address of the Ethernet (registered trademark) node 300.

This represents that as a result of search of the contents of the FDB 470 by the FDB control unit 460, the STP node 100 transmits a frame whose destination MAC address is a MAC address of the Ethernet (registered trademark) node 300 from the port P3 of the STP node 100.

The STP unit 500 of the STP node 100 transmits and receives BPDU to/from the STP nodes 110 and 120 through the input ports 400-1 and 400-2 and the frame analysis units 410-1 and 410-2, and the frame multiplexing units 430-1 and 430-2 and the output ports 440-1 and 440-2, and compares path costs with each other to determine a port state of the ports P1 and P2 to be controlled by STP of the STP node 100, as well as registering the port state at the port state table 510 of the STP node 100.

Registered at the port state table 510 of the STP node 100 is a port state (either the blocked state or the forwarding state) of a port (ports P1 and P2) to be controlled by STP of the STP node 100.

(Frame Broadcast-Transfer and MAC Address Learning)

First, description will be made of operation of transmitting a frame from the Ethernet (registered trademark) node 300 to the Ethernet (registered trademark) node 310 immediately after start of operation of the communication system shown in FIG. 1.

The STP node 100, upon receiving a frame transmitted from the Ethernet (registered trademark) node 300 under the control of the node itself at the input port 400-3 of the STP node 100, sends the frame to the switch unit 420 of the STP node 100.

The switch unit 420 of the STP node 100 asks the FDB control unit 460 of the STP node 100 to register, at the FDB 470 of the STP node 100, a relationship between a transmission source MAC address of the frame and a reception port of the frame as a relationship between a destination MAC address and an output port.

The FDB control unit 460 of the STP node 100 registers at the FDB 470 of the STP node 100 a relationship between a transmission source MAC address (the MAC address of the Ethernet (registered trademark) node 300) of the frame and a reception port (the port P3 of the STP node 100) of the frame as a relationship between a destination MAC address and an output port (see FIG. 4).

The foregoing operation of registering a relationship between a destination MAC address and an output port at the FDB 470 will be in general called MAC address learning.

Simultaneously with the request for MAC address learning, the switch unit 420 of the STP node 100 asks the FDB control unit 460 of the STP node 100 to search for an output port registered corresponding to the destination MAC address (a MAC address of the Ethernet (registered trademark) node 310) of the frame at the FDB 470 of the STP node 100.

By searching the FDB 470 of the STP node 100 with the destination MAC address of the frame as a key, the FDB control unit 460 of the STP node 100 obtains an output port registered corresponding to the destination MAC address of the frame.

Since immediately after start of operation of the communication system, nothing is registered at the FDB 470 of the STP node 100, search for an output port by the FDB control unit 460 of the STP node 100 fails.

Accordingly, the FDB control unit 460 of the STP node 100 notifies the switch unit 420 of the STP node 100 that search fails.

When receiving a notification of a search failure, the switch unit 420 of the STP node 100 transmits the frame through all the ports in the forwarding state among the ports to be controlled by STP and all the ports not to be controlled by STP (excluding a reception port of the frame).

More specifically, after being sent to the frame multiplexing units 440-1 and 440-2 of the STP node 100, the frame is transmitted to the STP nodes 110 and 120 from the output ports 440-1 and 440-2 of the STP node 100.

Since the output port 440-3 is a transmission unit of the reception port P3 of the frame, no frame is transmitted through the output port 440-3.

The above-described frame transfer method will be referred to as broadcast-transfer.

In the following, description will be made of operation of the STP node 110 which is executed after receiving, at the input port 400-2 of the STP node 110, a frame transmitted from the output port 440-1 of the STP node 100.

Operation of the STP node 120 executed after receiving, at the input port 400-1 of the STP node 120, a frame transmitted from the output port 440-2 of the STP node 100 is the same as the operation of the STP node 110 which will be described later.

Upon receiving a frame at the input port 400-2 of the STP node 110 which is transmitted from the STP node 100, the STP node 110 sends the frame to the frame analysis unit 410-2 of the STP node 110.

When the frame is BPDU, the frame analysis unit 410-2 of the STP node 110 sends the same to the STP unit 500 of the STP node 110 and when the frame is not BPDU, sends the same to the switch unit 420 of the STP node 110.

In a case where the frame reception port is to be controlled by STP, when the port state of the reception port is the blocked state, the switch unit 420 of the STP node 110 abandons the frame and when the same is the forwarding state, executes MAC address learning and frame broadcast-transfer similarly to the above-described operation executed when the STP node 100 receives a frame from the Ethernet (registered trademark) node 300.

More specifically, a relationship between a transmission source MAC address of the frame (the MAC address of the Ethernet (registered trademark) node 300) and the reception port (the port P2 of the STP node 110) will be registered at the FDB 470 of the STP node 110 as a relationship between a destination MAC address and an output port (see FIG. 4).

In addition, the frame is transmitted to the STP node 120 from the output port 440-1 of the STP node 110 and also to the Ethernet (registered trademark) node 310 from the output port 440-3 of the STP node 110.

As described in the foregoing, the frame transmitted from the Ethernet (registered trademark) node 300 directed to the Ethernet (registered trademark) node 310 is transferred to the Ethernet (registered trademark) node 310.

With reference to FIG. 1, since the frame transmitted from the output port 440-1 of the STP node 110 is received at the input port 2 of the STP node 120 in the blocked state, it is abandoned by the STP node 120 and is not further transferred.

(Unicast-Transfer of Frame)

Next, description will be made of operation of returning a frame from the Ethernet (registered trademark) node 310 to the Ethernet (registered trademark) node 300 subsequently to transfer of the frame from the Ethernet (registered trademark) node 300 to the Ethernet (registered trademark) node 310.

Upon receiving a frame directed to the Ethernet (registered trademark) node 300 from the Ethernet (registered trademark) node 310 at the input port 400-3 of the STP node 110, the STP node 110 sends the frame to the switch unit 420 of the STP node 110.

The switch unit 420 of the STP node 110 requests the FDB control unit 460 of the STP node 110 for MAC address learning related to the received frame and search for an output port.

More specifically, registered at the FDB 470 of the STP node 110 is a relationship between a transmission source MAC address of the frame (the MAC address of the Ethernet (registered trademark) node 310) and the reception port (the port P3 of the STP node 110) as a relationship between a destination MAC address and an output port (see FIG. 4).

Since by the above-described MAC address learning executed in the process of frame transfer from the Ethernet (registered trademark) node 300 to the Ethernet (registered trademark) node 310, the port P2 is registered as an output port at the FDB 470 of the STP node 110 in correspondence with the MAC address of the Ethernet (registered trademark) node 300 as a destination MAC address of the received frame, the FDB control unit 460 of the STP node 110 notifies the switch unit 420 of the STP node 110 that the output port of the received frame is the port P2.

After being sent to the frame multiplexing unit 430-2 of the STP node 110 by the switch unit 420 of the STP node 110, the frame is transmitted to the STP node 100 from the output port 440-2 of the STP node 110.

The foregoing frame transfer method is referred to as unicast-transfer.

Next, upon receiving the frame transmitted from the STP node 110 at the input port 400-1 of the STP node 100, the STP node 100 sends the frame to the frame analysis unit 410-1 of the STP node 100.

When the received frame is BPDU, the frame analysis unit 410-1 of the STP node 100 sends the same to the STP unit 500 of the STP node 100 and when the frame is not BPDU, sends the same to the switch unit 420 of the STP node 100.

In a case where the frame reception port is to be controlled by STP, when the port state of the reception port is the blocked state, the switch unit 420 of the STP node 100 abandons the frame and when the same is the forwarding state, executes MAC address learning and frame unicast-transfer similarly to the above-described case where the STP node 110 receives a frame from the Ethernet (registered trademark) node 310.

More specifically, a relationship between the transmission source MAC address of the frame (the MAC address of the Ethernet (registered trademark) node 310) and the reception port (the port P1 of the STP node 100) will be registered at the FDB 470 of the STP node 100 as a relationship between a destination MAC address and an output port (see FIG. 4).

Since by the above-described MAC address learning executed in the process of frame transfer from the Ethernet (registered trademark) node 300 to the Ethernet (registered trademark) node 310, the port P3 is registered as an output port at the FDB 470 of the STP node 100 in correspondence with the MAC address of the Ethernet (registered trademark) node 300 as a destination MAC address of the received frame, the FDB control unit 460 of the STP node 100 notifies the switch unit 420 of the STP node 100 that the output port of the frame is the port P3.

The frame is transmitted from the output port 440-3 of the STP node 100 to the Ethernet (registered trademark) node 300 by the switch unit 420 of the STP node 100.

Thus, the frame directed to the Ethernet (registered trademark) node 300 which is transmitted from the Ethernet (registered trademark) node 310 will be transferred to the Ethernet (registered trademark) node 300.

(Operation of STP Failure Recovery at Link Cut-Off)

Next, description will be made of failure recovery operation when a link 220 is cut off in the Ethernet (registered trademark) network shown in FIG. 1.

When the link 220 shown in FIG. 1 is cut off, a new spanning tree will be restructured by STP which detours a failing part.

Assume here that among the ports belonging to the STP nodes 100~120, as a result of change of the port states of the ports P1 and P2 by STP which are ports to be controlled by STP as shown in FIG. 2, such a spanning tree as indicated by the heavy line in FIG. 2 is restructured.

When a new spanning tree is restructured, the STP unit 500 of each of the STP nodes 100~120 asks the FDB control unit 460 of each of the STP nodes 100~120 to erase all the contents of the FDB 470 of STP nodes 100~120.

This is because even when a new spanning tree is restructured, unless the contents of the FDB are all erased or unless the contents of the FDB are updated according to the new spanning tree, a frame might be transmitted to a link developing the fault.

The above-described operation of erasing all the contents of FDB is referred to as flush of FDB.

Since after the FDB control unit 460 of each of the STP nodes 100~120 flushes the FDB 470 of the STP nodes 100~120, the frame will be transferred in a completely similar manner to that of the above-described frame transfer executed immediately after start of operation of the communication system, communication can be continued.

As described in the foregoing, in the Ethernet (registered trademark) network to which STP is applied, communication can be continued by restructuring a spanning tree detouring a failing part, as well as flushing or updating the FDB of the STP node.

Non-patent Literature 1: "STP (Spanning Tree Protocol)", IEEE Standards 802.1D, IEEE, 1998.

The above-described network node according to the related art, however, has a problem that as the number of entries in FDB is increased, time required for flushing or rewriting the FDB is increased to delay recovery from a failure.

FIG. 5 shows a graph of a relationship between the number of entries in FDB and time required for flushing FDB (flushing time) which is measured by using a mass-marketed Ethernet (registered trademark) node.

Reference to FIG. 5 finds that for erasing all of not less than 10,000 entries which are expected to be required for a trunk system communication system, not less than one second is required.

Here, FDB is in many cases mounted as CAM (Content Addressable Memory).

Although the CAM has extremely high-speed search performance, deletion or change of registration contents requires processing on an entry basis.

Therefore, such processing as erasing of the contents of numerous entries at once as flushing of FDB costs enormous time.

It is estimated that the reason why in the graph of FIG. 5, an FDB flushing time is proportionally increased to the number of entries of FDB is presumed that because the FDB of the Ethernet (registered trademark) node used in the measurement is formed of CAM, and entries in the FDB are sequentially erased one by one to require enormous time for flushing.

As described in the foregoing, when a failure occurs in an Ethernet (registered trademark) network to which STP is applied, even if a new spanning tree is restructured in a short time period, because enormous time is required for flushing FDB, it is impossible to realize such an extremely short failure recovery time as not more than 50 ms provided by SONET.

The present invention, which is intended to solve the above-described problems, aims at providing highly reliable network node, frame transfer program and frame transfer method which enable recovery in a short time period from an abnormality occurring due to a communication failure.

SUMMARY

According to an exemplary aspect of the invention, a network node for transferring a frame on a network by transfer destination information, includes a transfer destination information table for correlating virtual transfer destination information of a frame which information is virtually defined in correlation with destination information of the frame and is classified into a number of kinds not more than a total number of pieces of the destination information of the frame and the transfer destination information.

Since with the above-described structure, the present invention enables virtual transfer destination information to be flushed or updated in a shorter time than that required for flushing or updating information indicative of a relationship between frame destination information and transfer destination information, new information indicative of a relationship between frame destination information and transfer destination information can be generated in a further shorter time.

The network node of the present invention enables a highly reliable communication system to be set up which can be recovered from a failure in a short time period.

The reason is that since with a network node for transferring a frame onto a network by transfer destination information virtually defined in correlation with destination information of the frame, a transfer destination information table is provided which correlates virtual transfer destination information of a frame classified into kinds not more than a total number of pieces of frame destination information and transfer destination information, flush or update of virtual transfer destination information can be realized in a shorter time than that of flush or update of information indicative of a relationship between the destination information of the frame and the transfer destination information, so that new information indicative of a relationship between the transfer information of the frame and the transfer destination information can be generated in a further shorter time.

BRIEF DESCRIPTION OF THE DRAWINGS

FIG. 7 is a diagram showing an input port table 480 of the STP node 100 according to the first mode of implementation;

FIG. 8 is a diagram showing an FDB 470 of the STP node 100 according to the first mode of implementation;

FIG. 9 is a diagram showing a port label table 490 of the STP node 100 according to the first mode of implementation;

FIG. 24 is a flow chart showing operation of the STP node 100 according to the first mode of implementation of the present invention;

FIG. 36 is a diagram showing an RPR node address table of the RPR node according to the third mode of implementation; and FIG. 37 is a diagram showing an address label table of the RPR node according to the third mode of implementation.

EXEMPLARY EMBODIMENT

Next, best modes for implementing the present invention will be described.

(First Mode of Implementation)

In the following, a first mode of implementation of the present invention will be described with reference to the drawings.

(Structure of the First Mode of Implementation)

(Structure of Communication System)

In the following, description will be made of a method of reducing an FDB flushing time when the present invention is applied to the STP nodes (Ethernet (registered trademark) nodes operable conformed to STP) 100~120 of the communication system shown in FIG. 1 and FIG. 2 which is used for describing the related art.

(Structure of Node)

Figure 6:
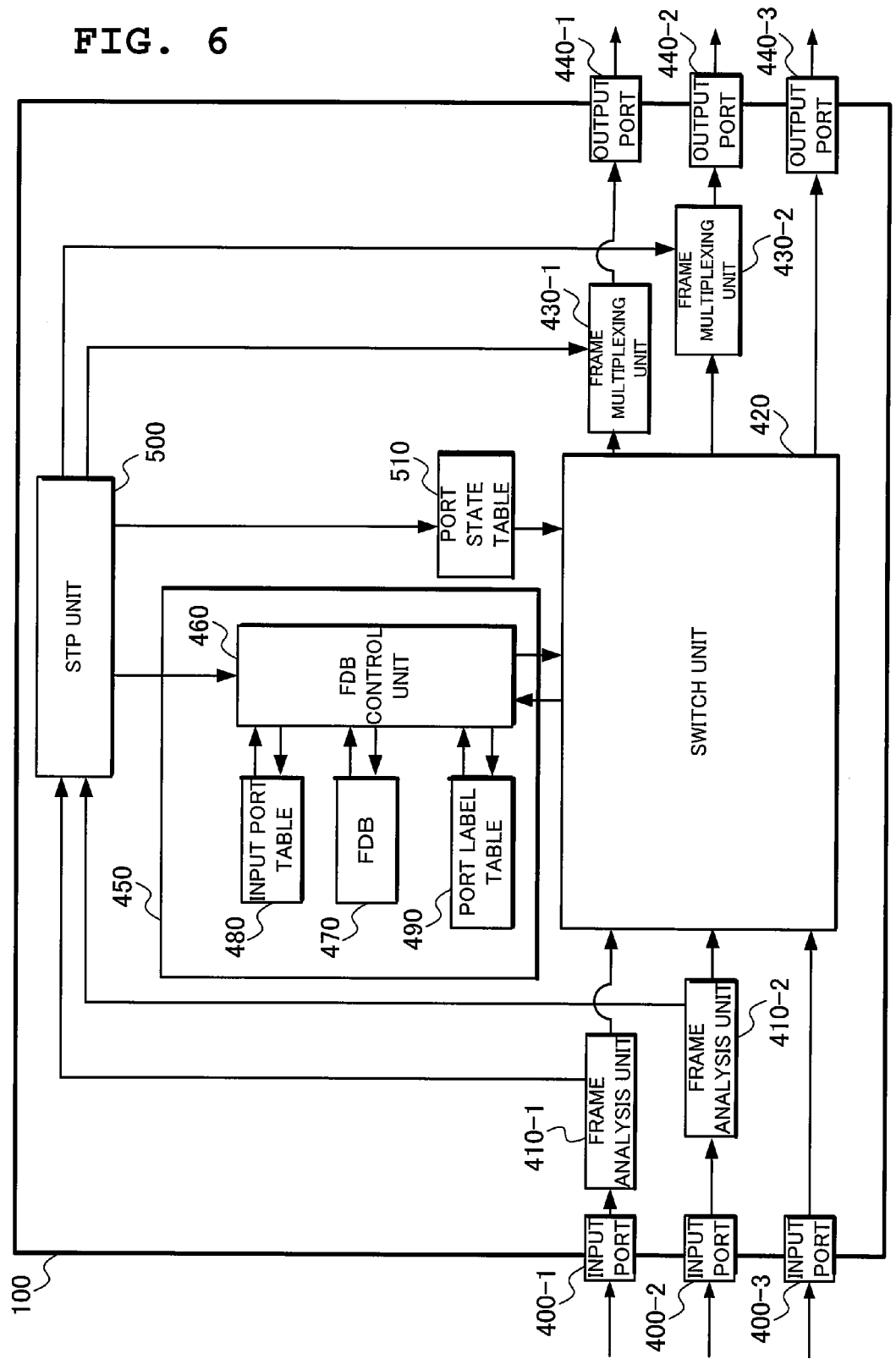
FIG. 6 is a diagram showing a structure of the STP node 100 according to a first mode of implementation of the present invention.

FIG. 6 is a diagram showing a structure of the STP node 100 to which the present invention is applied.

Although the structure of the STP node 100 to which the present invention is applied will be described in the following, structures of the STP nodes 110 and 120 to which the present invention is applied are the same as that of the STP node 100 to which the present invention is applied.

In the following, simply describing an STP node is assumed to represent an STP node to which the present invention is applied.

Figure 3:
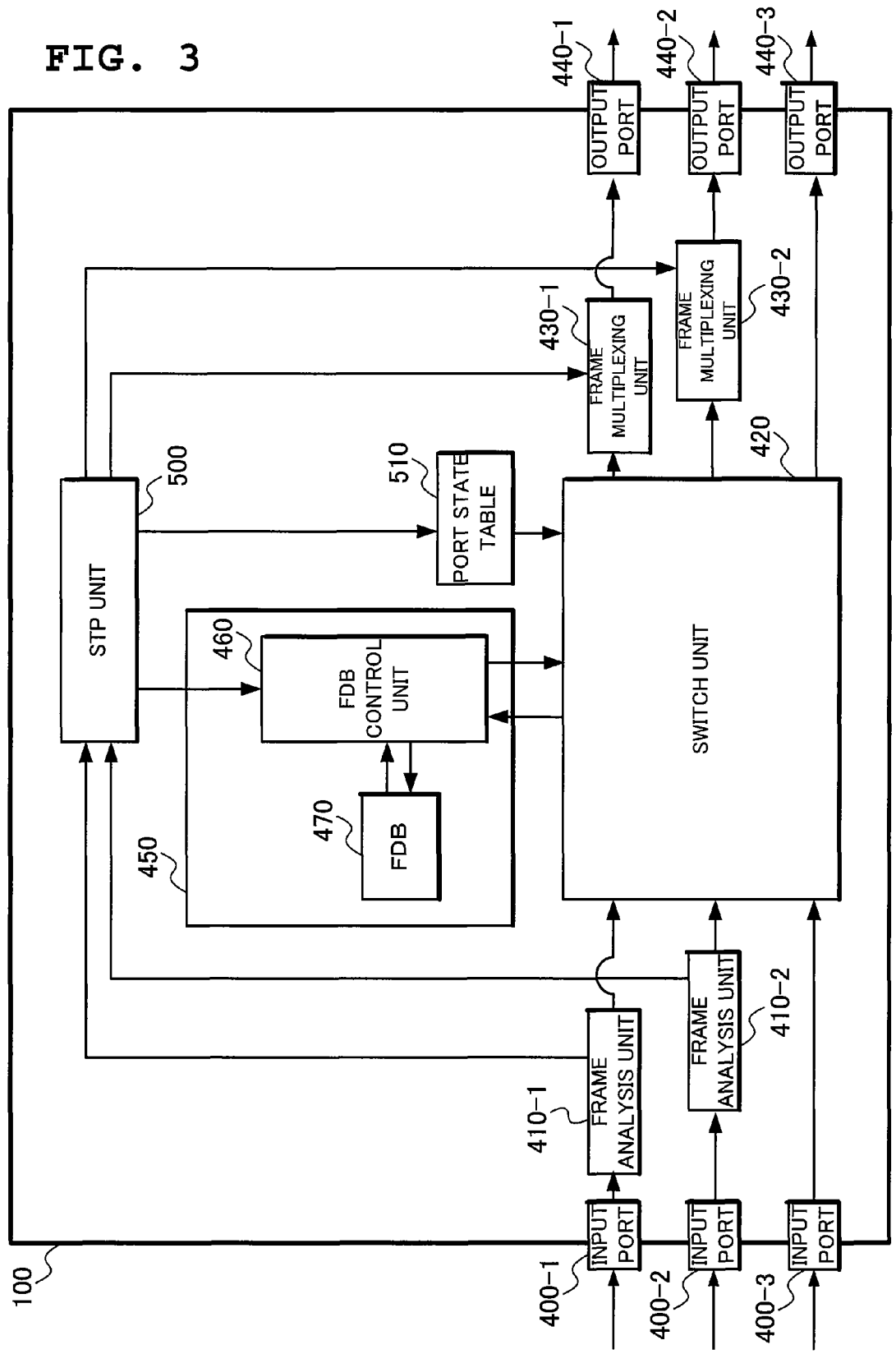
FIG. 3 is a diagram showing a structure of an STP node 100 according to related art.
Figures 4, 5:
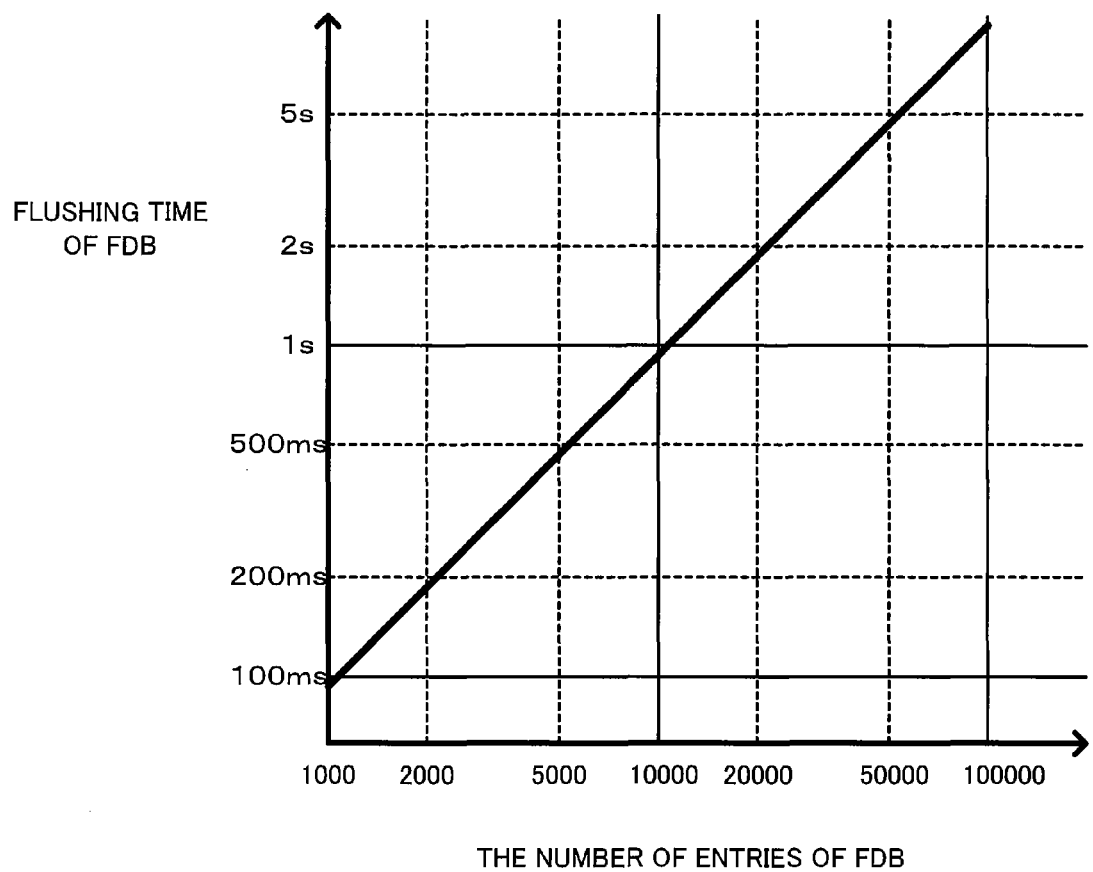
FIG. 4 is a diagram showing an FDB 470 of the STP node 100 according to related art.
FIG. 5 is a graph showing a relationship between the number of entries in FDB and FDB flushing time.

Structure of the STP node 100 shown in FIG. 6 differs from the structure of the STP node 100 shown in FIG. 3 in that the FDB unit 450 of the STP node 100 is newly provided with an input port table 480 and a port label table 490 as addition.

The input port table 480 of the STP node 100 is a table for registering a relationship between an input port of the STP node 100 and a port label, which is managed by the FDB control unit 460 of the STP node 100.

In the input port table 480 of the STP node 100, an input port and a port label have a one-for-one relationship in which when each port of the STP node 100 is independent, a different port label is correlated with a different input port.

Correlating the same port label with a different input port to form a plurality of input ports into one virtual input port, however, enables application of the present invention to a node to which link aggregation (LAG) is applied.

In the following, description will be made assuming that each port of the STP node 100 is independent.

FIG. 7 shows an example of the input port table 480 of the STP node 100.

In the first entry of the input port table 480 of the STP node 100 shown in FIG. 7, with a reception unit of the port P1 (the input port 400-1 or the input port P1) of the STP node 100, a port label α is correlated.

The FDB 470 of the STP node 100 is a data base for registering a relationship between a destination MAC address and a port label, which is managed by the FDB control unit 460 of the STP node 100.

In the FDB 470 of the STP node 100 according to the related art, with a destination MAC address, an output port of the STP node 100 is correlated, while in the FDB 470 of the STP node 100 according to the present invention, a port label is correlated.

The port label registered at the FDB 470 of the STP node 100 is any one of port labels registered at the input port table 480 of the STP node 100.

FIG. 8 shows an example of the FDB 470 of the STP node 100.

In the first entry of the FDB 470 of the STP node 100 shown in FIG. 8, with a MAC address of the Ethernet node 300, a port label γ is registered.

The port label table 490 of the STP node 100 is a table for registering a relationship between a port label and an output port of the STP port 100, which is managed by the FDB control unit 460 of the STP node 100.

At the start of operation of the STP node, in the port label table 490 of the STP node 100, a port label registered at the input port table 480 of the STP node 100 is correlated with an output port to be paired with an input port correlated with the port label in the input port table of the STP node 100.

An output port to be paired with an input port is, for example, the output port P1 (the output port 440-1 or the transmission unit of the output port P1) to the input port P1 (the input port 400-1 or the reception unit of the port P1), and the output port P2 to the input port P2.

FIG. 9 shows an example of the port label table 490 of the STP node 100.

In the first entry of the port label table 490 of the STP node 100 shown in FIG. 9, with the port label α, a transmission unit of the port P1 (the output port 440-1 or the output port P1) of the STP node 100 is correlated.

Figure 21:
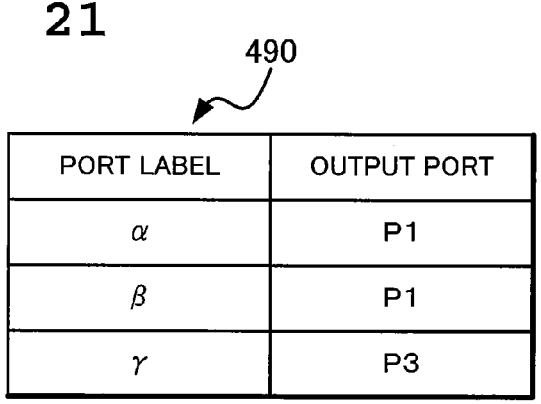
FIG. 21 is a diagram showing the port label table 490 of the STP node 100 according to the first mode of implementation.

As shown in FIG. 21, in the port label table 490 of the STP node 100, the same output port can be correlated with a different port label.

Figure 11:
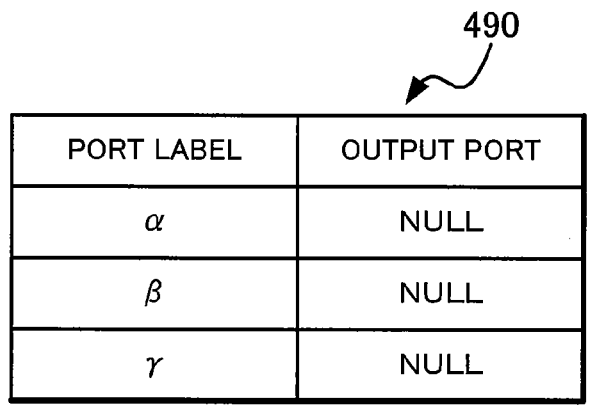
FIG. 11 is a diagram showing the port label table 490 of the STP node 100 according to the first mode of implementation.
Figure 16:
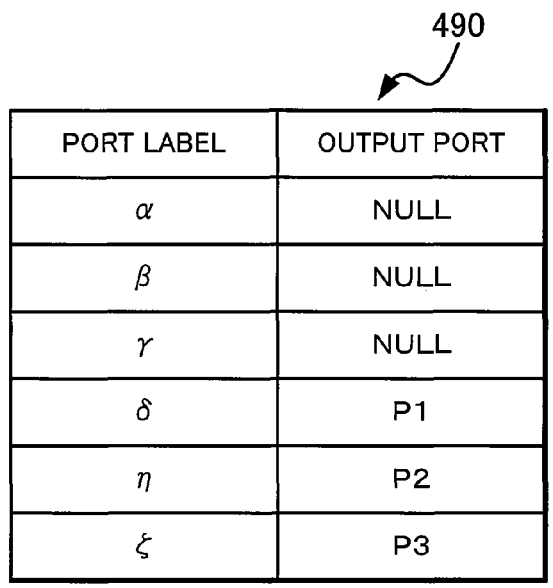
FIG. 16 is a diagram showing the port label table 490 of the STP node 100 according to the first mode of implementation.

Also as shown in FIG. 11 or FIG. 16, an invalid value (hereinafter referred to as Null value) can be set as an output port.

Figure 10:
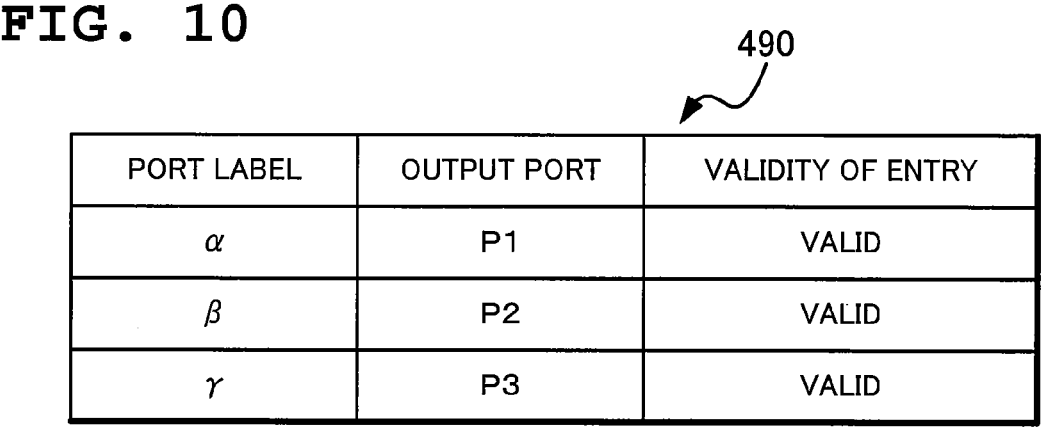
FIG. 10 is a diagram showing the port label table 490 of the STP node 100 according to the first mode of implementation.
Figure 13:
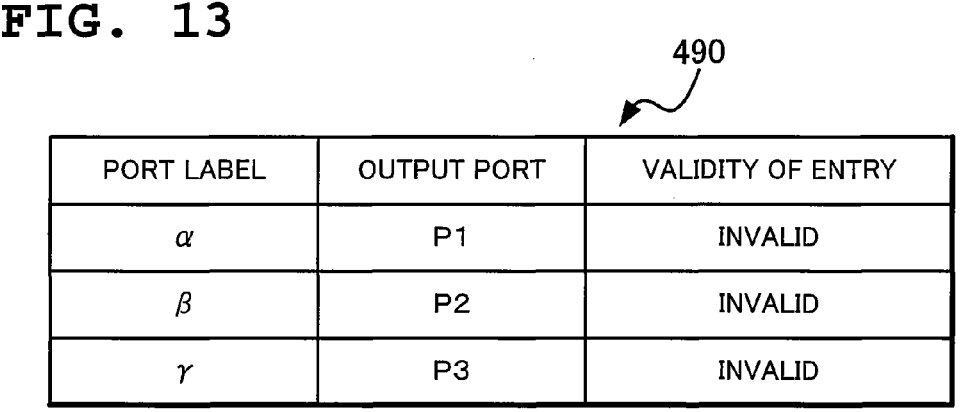
FIG. 13 is a diagram showing the port label table 490 of the STP node 100 according to the first mode of implementation.

Alternatively, in place of setting the Null value in the output port, with a field indicative of validity of an entry provided in each entry of the port label table 490 of the STP node 100, when the field indicates invalidity, even registration of a valid value in the output port may be considered to be the Null value as shown in FIG. 10 or FIG. 13.

By referring to or updating the input port table 480, the FDB 470 and the port label table 490 of the STP node 100, the FDB control unit 460 of the STP node 100 executes MAC address learning, output port search and FDB update (flush and rewrite).

Here, a hardware structure of the STP node 100 will be described.

Figure 14:
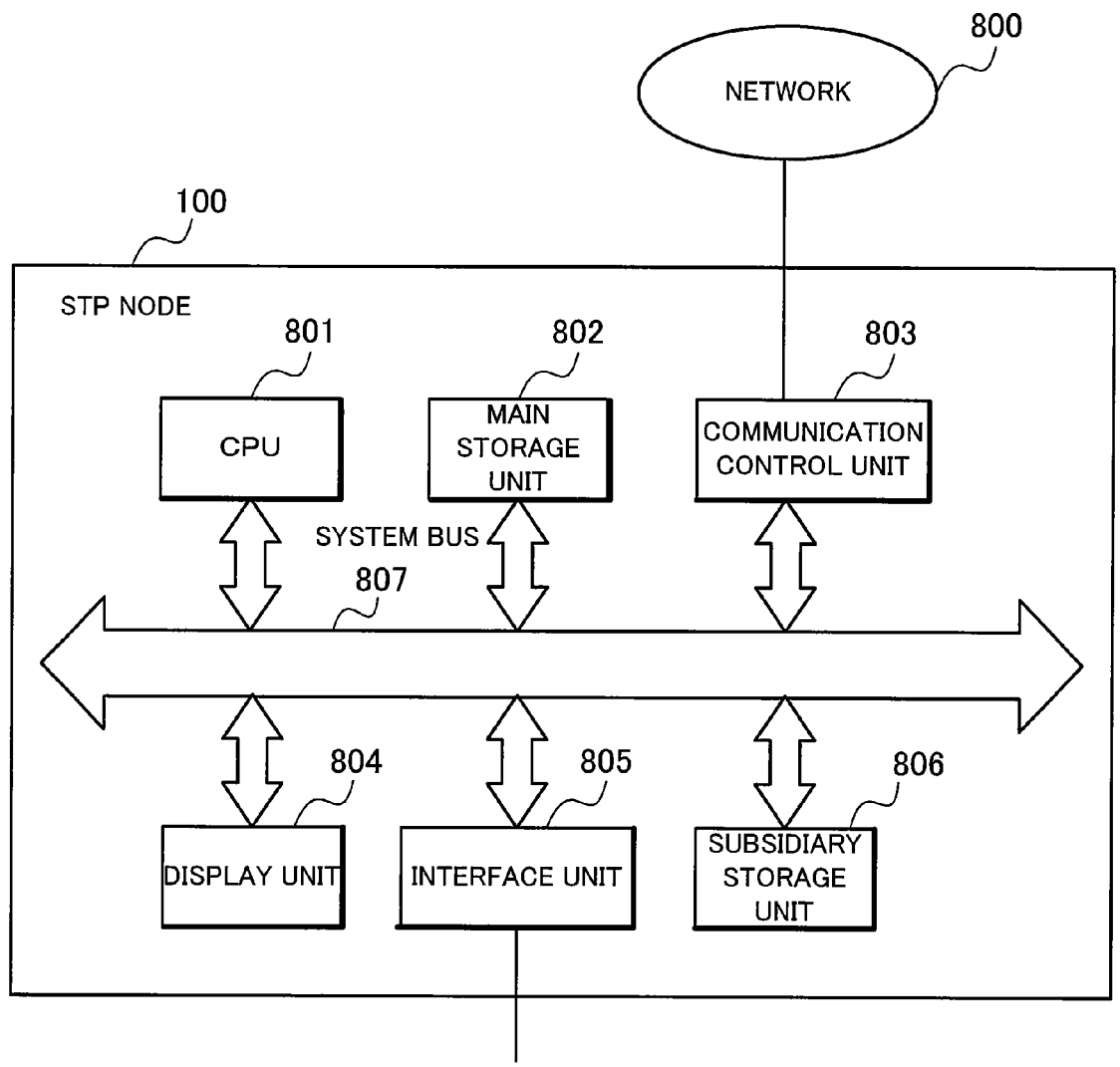
FIG. 14 is a block diagram showing a hardware structure of the STP node 100 according to the first mode of implementation.

FIG. 14 is a block diagram showing a hardware structure of the STP node 100 of the communication system according to the present mode of implementation.

With reference to FIG. 14, the STP node 100 according to the present mode of implementation, which can be realized by the same hardware structure as that of a common computer device, comprises a CPU (Central Processing Unit) 801, a main storage unit 802 which is a main memory such as a RAM (Random Access Memory) for use as a data working region or a data temporary saving region, a communication control unit 803 for transmitting and receiving data through a network 800, a display unit 804 such as a liquid crystal display, an interface unit 805 connected to a peripheral apparatus to transmit/receive data, a subsidiary storage unit 806 which is a hard disk device formed of a non-volatile memory such as a ROM (Read Only Memory), a magnetic disk or a semiconductor memory, and a system bus 807 connecting the above-described components with each other.

The STP node 100 according to the present mode of implementation has its operation realized not only in hardware with a circuit part formed of a hardware part such as an LSI (Large Scale Integration) mounted which part has a program for realizing such functions as described above internally incorporated in the STP node 100 but also in software by executing a program which provides the respective functions of the above-described components by the CPU 801 on a computer processing device.

In other words, the CPU 801 realizes the above-described respective functions in software by loading a program stored in the subsidiary storage unit 807 into the main storage unit 802 and executing the same to control operation of the STP node 100.

(Operation of the First Mode of Implementation)
(Frame Transfer Operation and MAC Address Learning)

In the following, operation of frame transfer by the STP node 100 will be described with reference to the flow chart shown in FIG. 24.

Assume that the contents registered at the input port table 480 of the STP node 100 are as shown in FIG. 7 and the contents registered at the port label table 490 of the STP node 100 are as shown in FIG. 9.

Since the same operation is executed, after the STP node 100 receives a frame from an adjacent node (S2401), by the switch unit 420 of the STP node 100 to request the FDB control unit 460 of the STP node 100 to execute MAC address learning and output port search related to a received frame (S2402) as that of the related art, no description will be made thereof.

After obtaining a port label registered for the reception port of the frame at the input port table 480 of the STP node 100 (S2403), the FDB control unit 460 of the STP node 100 registers a relationship between a transmission source MAC address of the frame and the obtained port label at the FDB 470 of the STP node 100 as a relationship between a destination MAC address and a port label (S2404).

The foregoing processing is the MAC address learning of the present invention.

The FDB control unit 460 of the STP node 100 also searches the FDB 470 of the STP node 100 for a port label registered for the destination MAC address of the frame (Steps S2405 and S2406).

When the acquisition of the port label succeeds, the FDB control unit 460 of the STP node 100 searches the port label table 490 of the STP node 100 for an output port registered for the port label (Step S2407).

On the other hand, when the acquisition of the port label fails, the FDB control unit 460 of the STP node 100 notifies the switch unit 420 of the STP node 100 that the acquisition of the output port fails (Step S2408).

Subsequently, when in the port label table 490 of the STP node 100, an entry related to the port label obtained at Step S2406 is valid and an output port correlated with the port label fails to have the Null value (S2409), the FDB control unit 460 of the STP node 100 notifies the switch unit of the STP node 100 of the obtained output port (S2410).

On the other hand, in other cases than those described above (i.e. a case where the entry is invalid or a case where the output port has the Null value), the FDB control unit 460 of the STP node 100 notifies the switch unit 420 of the STP node 100 that the acquisition of the output port fails (Step S2408).

Since the operation of frame transfer to follow by the switch unit 420 of the STP node 100 is the same as that of the related art, no description will be made thereof.

(FDB Flush Operation at Failure Recovery)

Figure 2:
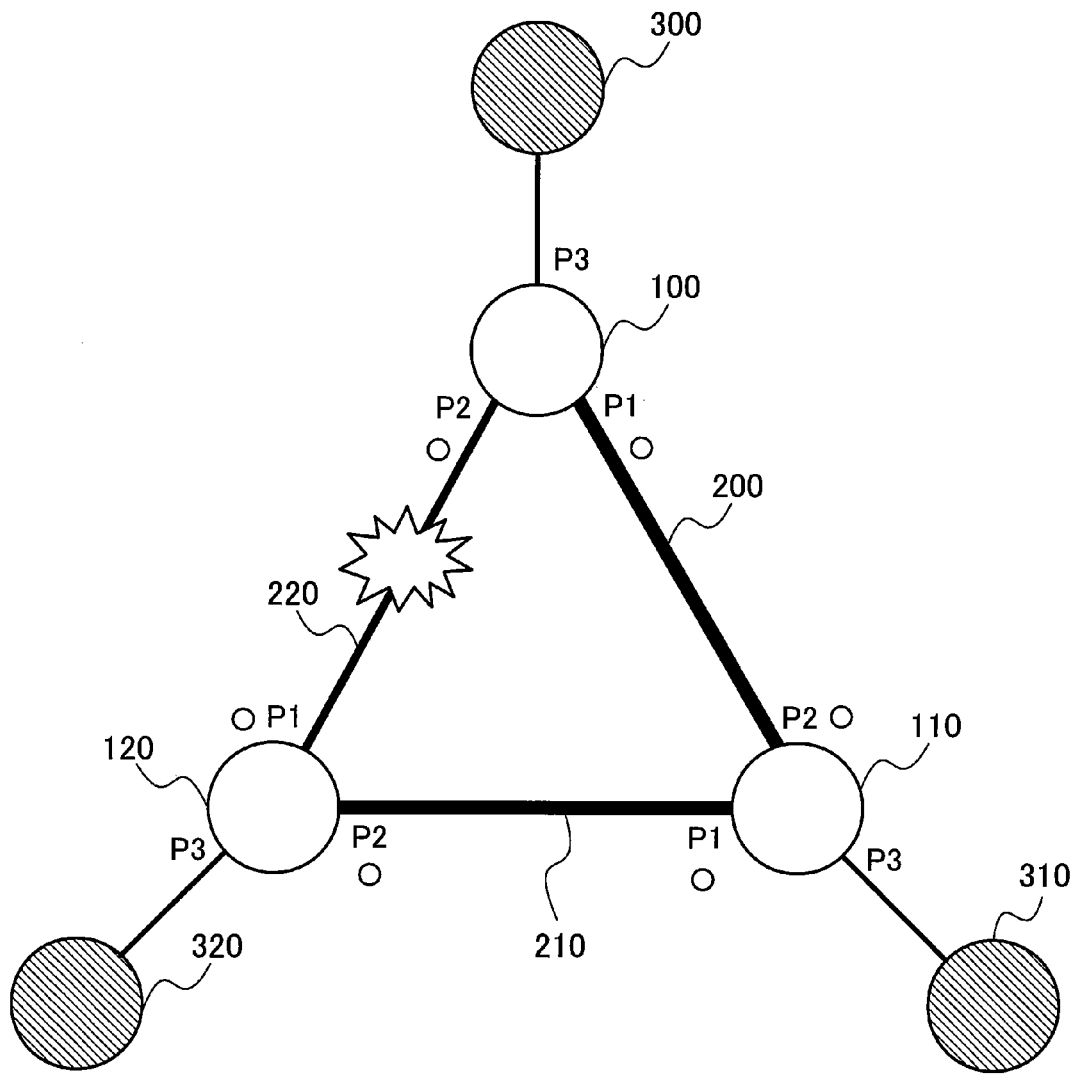
FIG. 2 is a diagram showing an Ethernet (registered trademark) network in a case where a link 220 in FIG. 1 is cut off.
Figure 25:
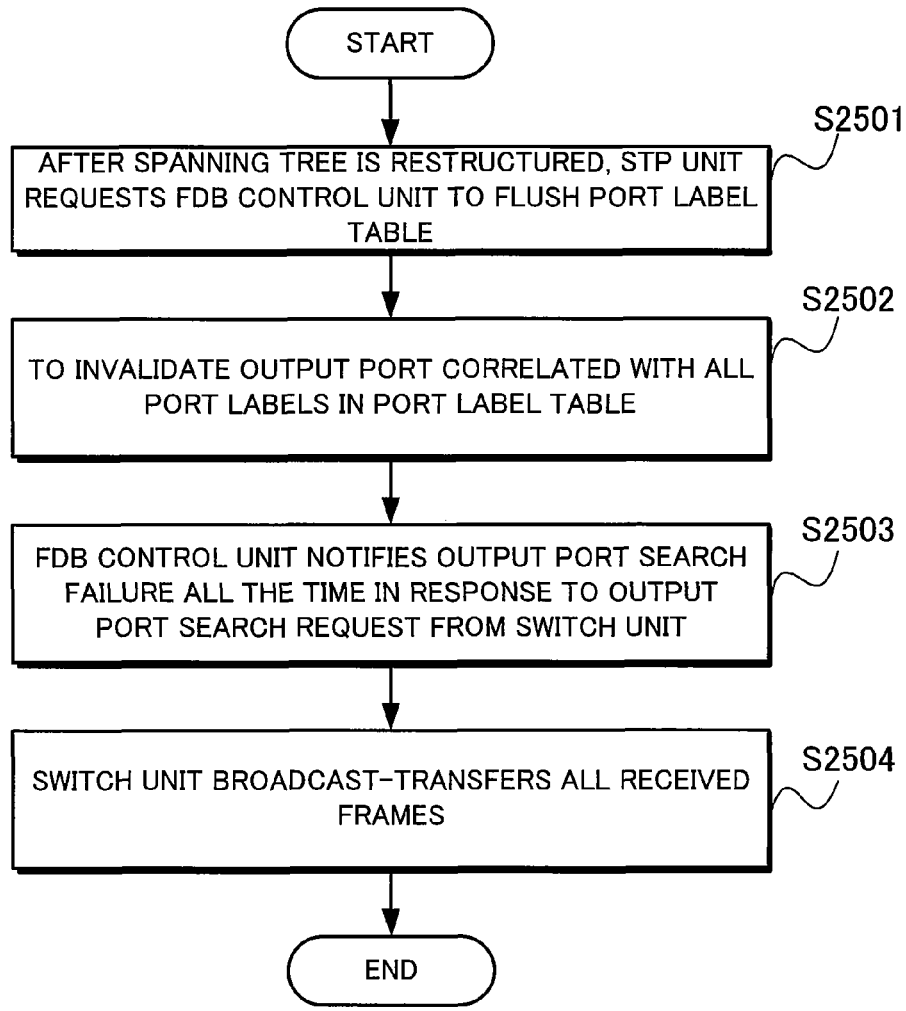
FIG. 25 is a flow chart showing operation of the STP node 100 according to the first mode of implementation of the present invention.

In the following, description will be made of operation of flushing the FDB by the STP node 100 after the spanning tree shown in FIG. 2 is restructured due to cut-off of the link 220 with reference to the flow chart shown in FIG. 25.

After a new spanning tree is restructured, the STP unit 500 of the STP node 100 requests the FDB control unit 460 of the STP node 100 to flush the port label table 490 of the STP node 100 (Step S2501).

Figure 12:
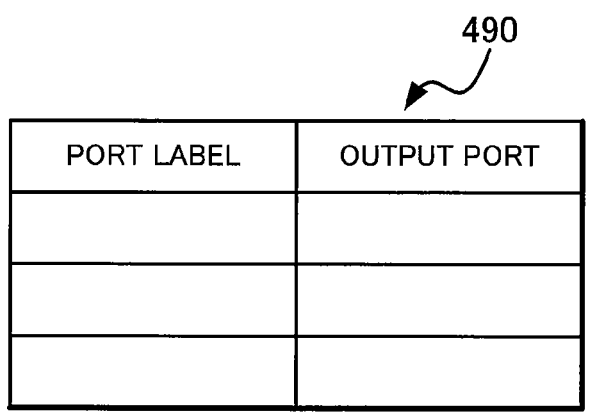
FIG. 12 is a diagram showing the port label table 490 of the STP node 100 according to the first mode of implementation.

In response to the request, in the port label table 490 of the STP node 100, with respect to all the port labels, the FDB control unit 460 of the STP node 100 changes output ports correlated therewith to the Null value (FIG. 11) or deletes all the entries (FIG. 12) or sets, in all the entries, a value indicative of invalidity in the fields indicative of their validity (invalidation of an output port) (FIG. 13) (S2502).

After the above-described processing is completed, the FDB control unit 460 of the STP node 100 may erase all the entries in the FDB 470 of the STP node 100 similarly to the related art.

After the foregoing processing, since the FDB control unit 460 of the STP node 100 notifies an output port search failure all the time in response to a request for output port search by the switch unit 420 of the STP node 100 (S2503), the switch unit 420 of the STP node 100 will broadcast-transfer all the received frames (S2504).

This state is a state where FDB is flushed in the related art, that is, a state where continuation of communication is enabled after recovery from a failure.

Since among the entries in the port label table 490 of the STP node 100, entries which require the above processing is as many as the number of ports mounted on the STP node 100 and only a few hundreds of ports are expected to be mounted on one device at most, processing the port label table enables the processing to be completed in much a shorter time than that of a case of flushing the FDB itself whose number of entries is extremely large.

Therefore, in the Ethernet (registered trademark) network formed of an STP node to which the present invention is applied, recovery from a failure is enabled in a shorter time period than that of the related art.

Since only with the execution of the above-described processing, the switch unit 420 of the STP node 100 continues broadcast-transferring all the frames to press a communication band of the Ethernet (registered trademark) network, the FDB control unit 460 of the STP node 100 executes processing set forth below.

Figure 26:
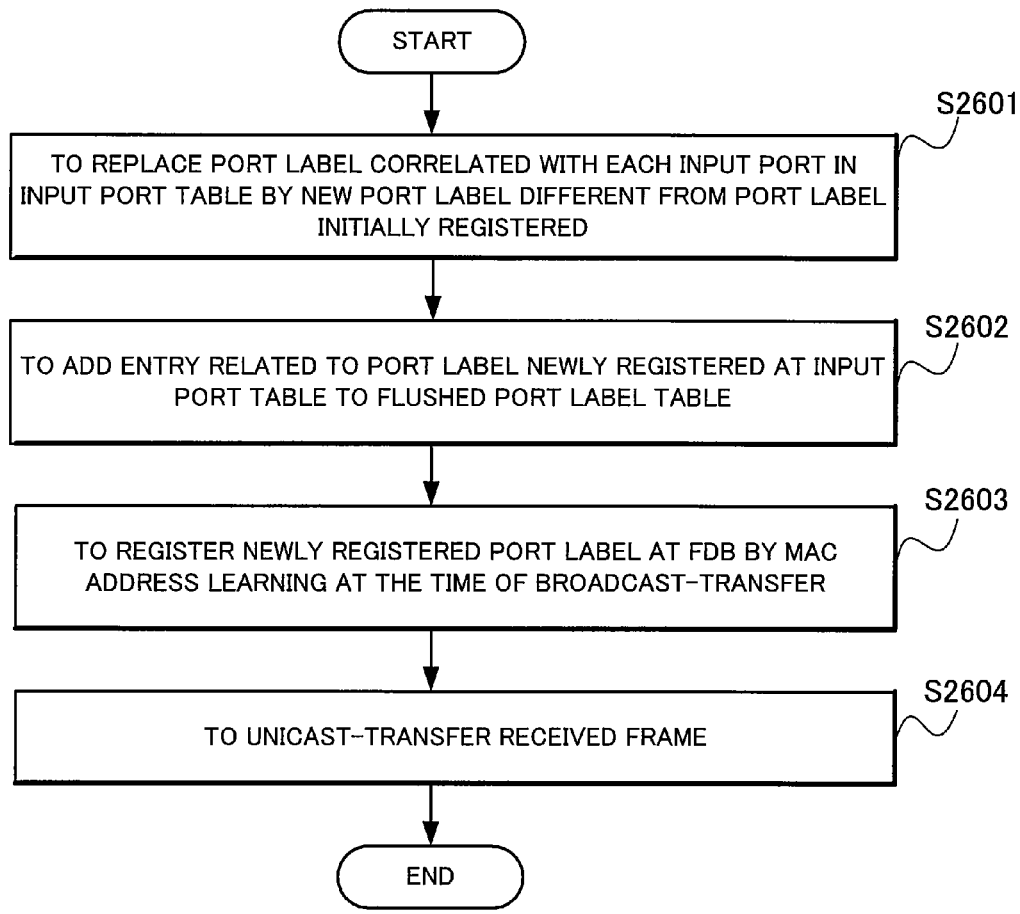
FIG. 26 is a flow chart showing operation of the STP node 100 according to the first mode of implementation of the present invention.

With reference to the flow chart shown in FIG. 26, the FDB control unit 460 of the STP node 100 replaces a port label correlated with each input port in the input port table 480 of the STP node 100 by a new port label different from the port label initially registered (S2601).

At this time, a port label to be newly registered should not overlap with any of initially registered port labels.

Figure 15:
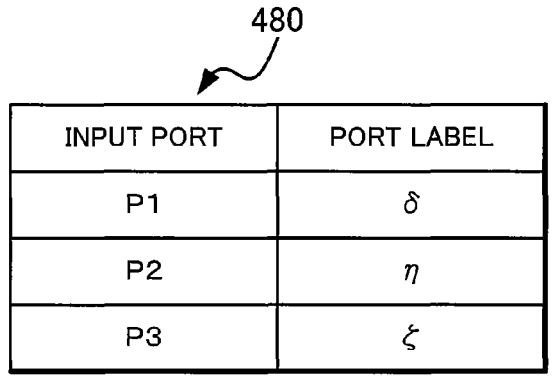
FIG. 15 is a diagram showing the input port table 480 of the STP node 100 according to the first mode of implementation.

In the input port table 480 of the STP node 100 shown in FIG. 15, for example, the port label α is replaced by a port label δ, a port label β is replaced by a port label η, and the port label γ is replaced by a port label ζ.

Next, the FDB control unit 460 of the STP node 100 adds, to the flushed port label table 490 of the STP node 100, an entry related to the port label newly registered in the input port table 480 of the STP node 100 (S2602).

Output ports to be registered for these port labels are output ports to be paired with input ports corresponding to these port labels in the input port table 480 of the STP node 100.

For the input port P1 (the input port 400-1 or the reception unit of the port P1), for example, the output port P1 (the output port 440-1 or the transmission unit of the output port P1) is registered.

Figure 17:
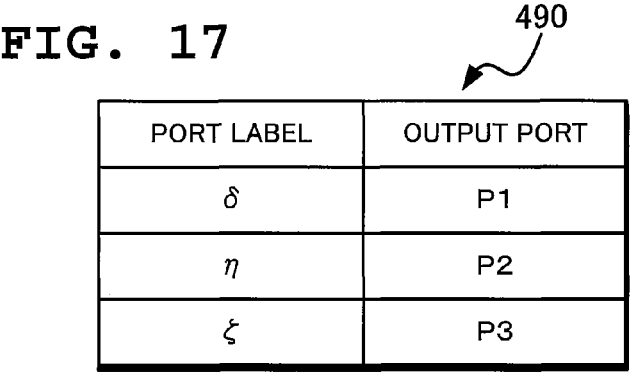
FIG. 17 is a diagram showing the port label table 490 of the STP node 100 according to the first mode of implementation.
Figure 18:
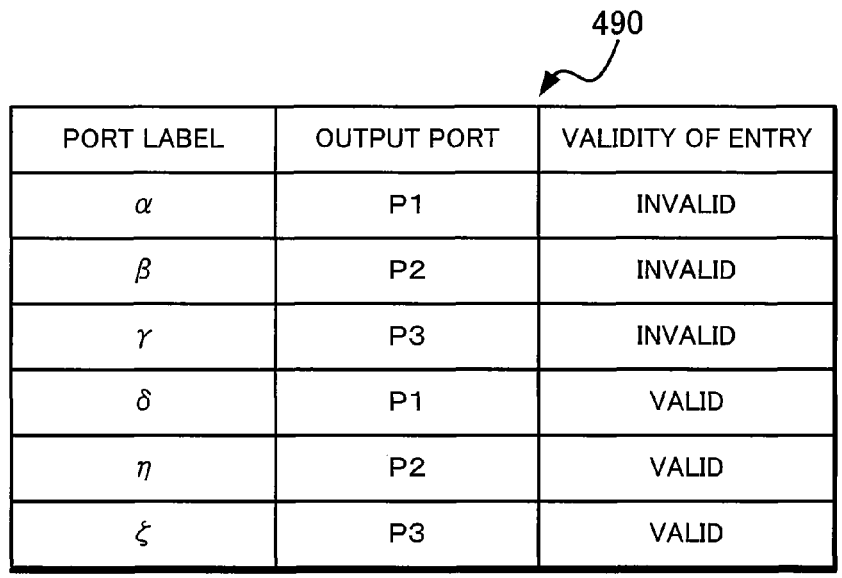
FIG. 18 is a diagram showing the port label table 490 of the STP node 100 according to the first mode of implementation.

Shown in the port label tables 490 illustrated in FIG. 16 through FIG. 18 is, addition, to the above flushed port label table 490 of the STP node 100, of an entry in which the output port P1 is correlated with the port label δ, an entry in which the output port P2 is correlated with the port label η and an entry in which the output port P3 is correlated with the port label ζ.

Since when the foregoing processing enables a newly registered port label to be registered at the FDB 470 of the STP node 100 by MAC address learning at the time of frame broadcast-transfer (S2603), the received frame will be unicast-transferred (S2604), press of the communication band of the Ethernet (registered trademark) network will be eliminated in due time.

In addition, since the number of entries requiring the above-described processing is as many as the number of ports of the STP node 100, a failure recovery time will be barely affected.

Figure 19:
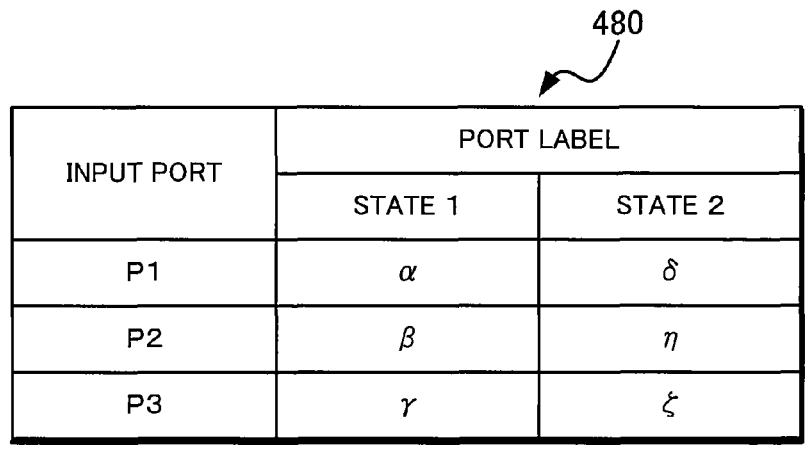
FIG. 19 is a diagram showing the input port table 480 of the STP node 100 according to the first mode of implementation.
Figure 20:
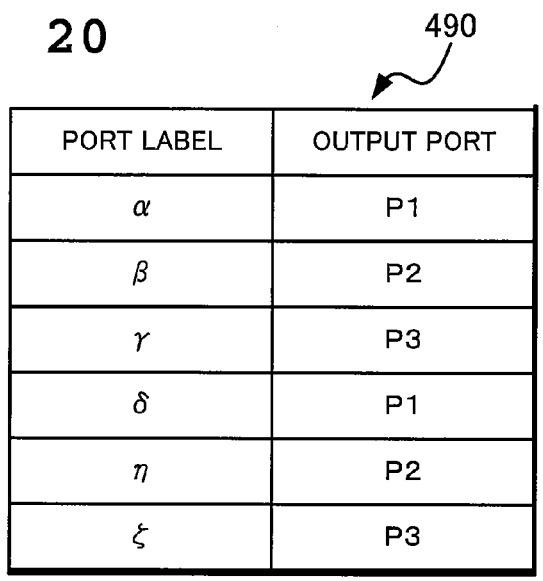
FIG. 20 is a diagram showing the port label table 490 of the STP node 100 according to the first mode of implementation.

For further speeding up the time required for the above-described processing, for example, in the input port table 480 of the STP node 100 as shown in FIG. 19, two port labels should be correlated with one input port in advance, a port label for use before failure occurrence (which is to be registered in the field of state 1 in FIG. 19) and a port label for use after failure occurrence (which is to be registered in the field of state 2 in FIG. 19), and in the port label table 490 of the STP node 100 as shown in FIG. 20, the above-described relationship between a port label and an output port should be registered in advance.

Before a failure occurs, a port label registered in the field of the state 1 in the input port table shown in FIG. 19 is used for MAC address learning.

Figure 27:
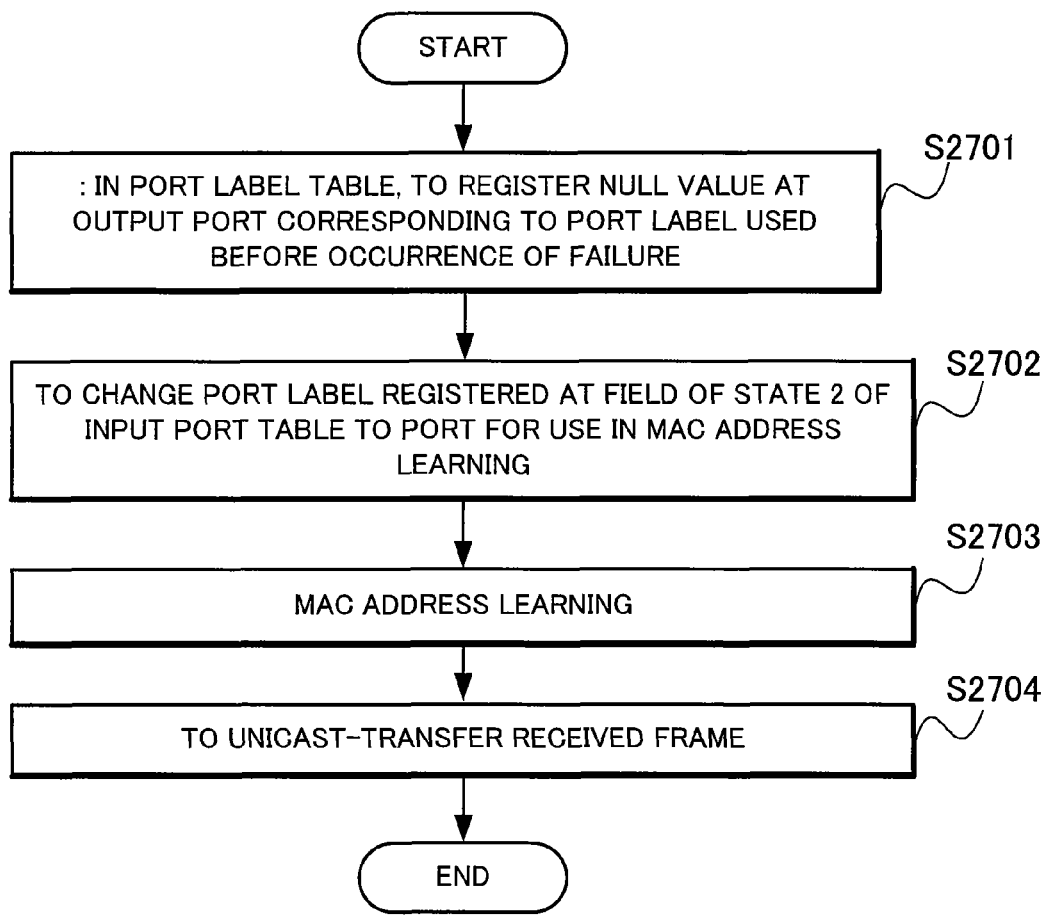
FIG. 27 is a flow chart showing operation of the STP node 100 according to the first mode of implementation of the present invention.

After the failure occurs, with reference to the flow chart shown in FIG. 27, register the Null value as an output port corresponding to a port label used before the failure occurs (the port labels α, β and γ in FIG. 20) in the port label table 490 of the STP node 100 (S2701), as well as changing the port label registered at the field of the state 2 in the input port table shown in FIG. 19 to a label for use in MAC address learning (S2702).

The foregoing arrangement enables the above-described processing (unicast-transfer, S2704) to be completed only by invalidating a part of entries of the port label table and changing a port label for use in MAC address learning (S2703).

(Rewrite of FDB)

In STP failure recovery operation, there is a case where only by rewriting a part of entries, without flushing the FDB, communication can be continued.

Figure 1:
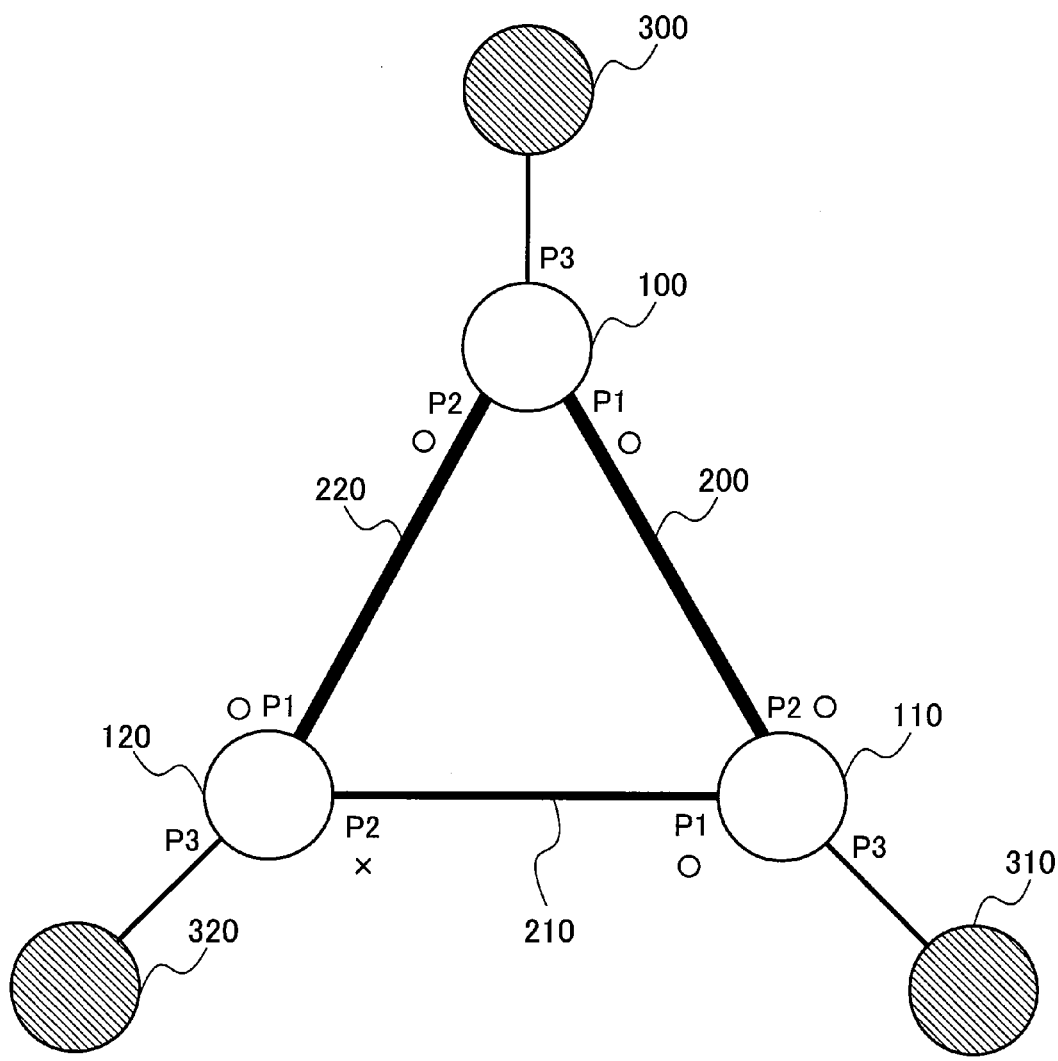
FIG. 1 is a diagram showing an Ethernet (registered trademark) network formed of three STP nodes and three Ethernet (registered trademark) nodes.
Figure 28:
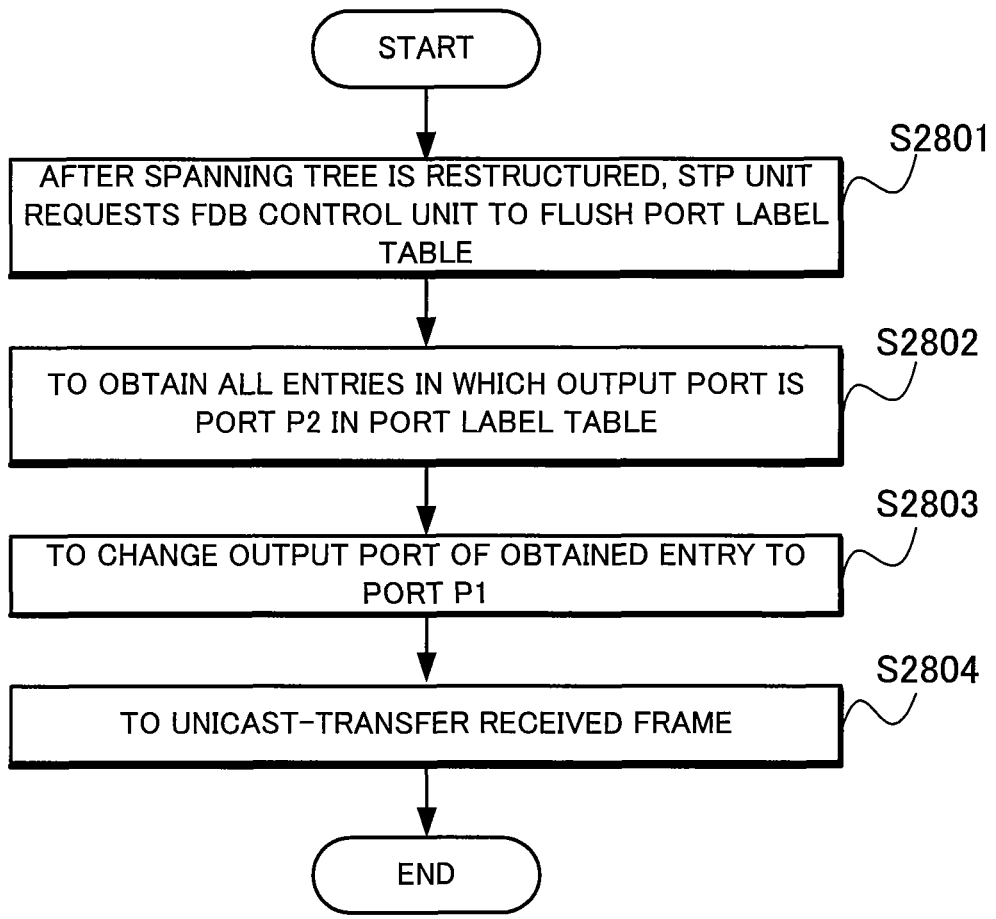
FIG. 28 is a flow chart showing operation of the STP node 100 according to the first mode of implementation of the present invention.

With reference to the flow chart shown in FIG. 28, for example, after a new spanning tree is restructured upon a transition of the Ethernet (registered trademark) network shown in FIG. 1 to the Ethernet (registered trademark) network shown in FIG. 2 as a result of cut-off of the link 220, the STP unit 500 of the STP node 100 requests the FDB control unit 460 of the STP node 100 to update the port label table 490 of the STP node 100 (S2801).

Subsequently, only by changing the output port in all the entries (acquisition of an entry, S2802) whose output port is the port P2 in the port label table 490 of the STP node 100 to the port P1 by the FDB control unit 460 of the STP node 100 (S2803), recovery from a failure is enabled similarly to that described above to unicast-transfer the received frame (S2804).

In this case, in the related art, such processing requiring enormous time should be executed as of after examining whether an output port in each of all the entries is the port P2 or not in the FDB 470 shown in FIG. 3, deleting the entry whose output port is the port P2.

In the present invention, on the other hand, since only rewriting an output port registered for the port label β from P2 to the port P1 in the port label table 490 completes the above-described processing as shown in FIG. 21, recovery from a failure is enabled in an extremely short time period.

In a communication system in which with a plurality of VLAN (Virtual LAN) set in an Ethernet (registered trademark) network, there exits a spanning tree for each VLAN, the above-described manner of rewriting an output port will affect all the VLAN, so that even when communication can be continued in a certain VLAN, communication might not be continued in other VLAN.

Figure 22:
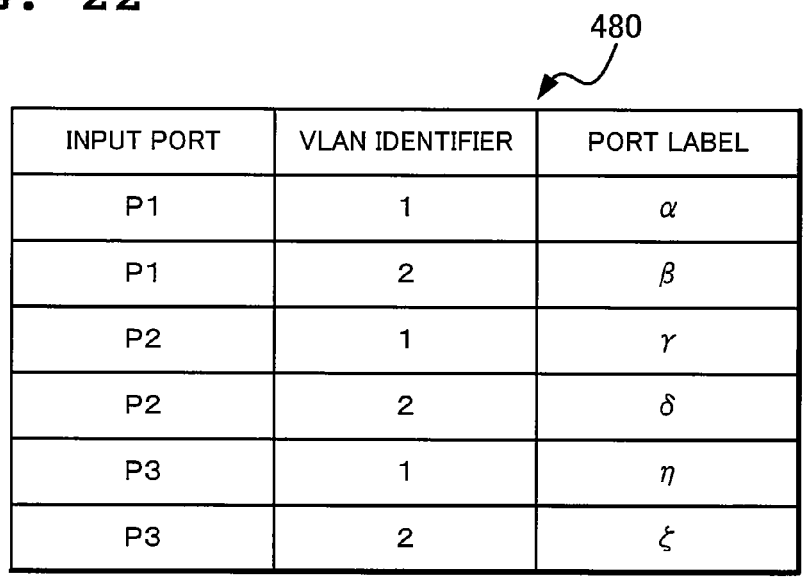
FIG. 22 is a diagram showing the input port table 480 of the STP node 100 according to the first mode of implementation.
Figure 23:
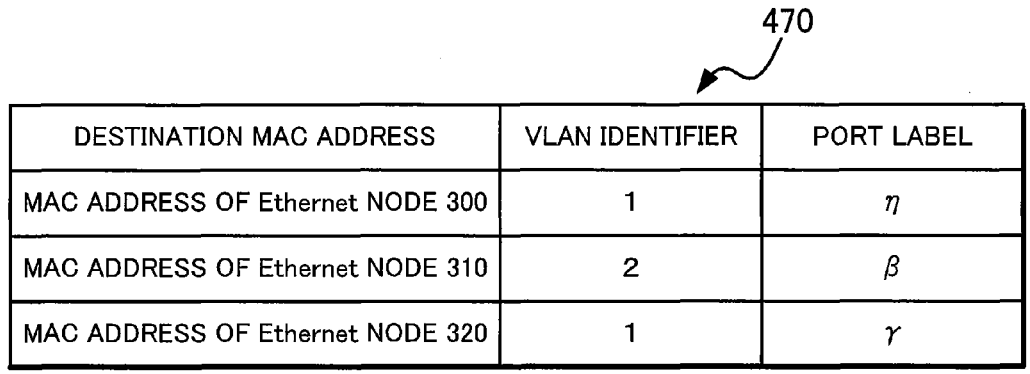
FIG. 23 is a diagram showing the FDB 470 of the STP node 100 according to the first mode of implementation.

In such a case, in the input port table 480 of the STP node 100 as shown in FIG. 22, correlating a port label with an input port and a VLAN identifier and in the FDB 470 of the STP node 100 as shown in FIG. 23, correlating a port label with a destination MAC address and a VLAN identifier enables processing on a VLAN basis similarly to that described above to eliminate the problems set forth above.

(Effects of the First Mode of Implementation)

The foregoing described present mode of implementation attains the following effects.

First, a highly reliable communication system can be set up which can be recovered from a failure in a short time period.

The reason is that there are provided for executing MAC address learning, output port search and FDB update (flush and rewrite), the input port table 480 for registering a relationship between an input port of the STP node and a port label, the FDB 470 for registering a relationship between a destination MAC address and a port label and the port label table 490 for registering a relationship between a port label and an output port of the STP node 100 which are managed by the FDB control unit 460 of the STP node 100, and after restructuring of a new spanning tree, the port label table 490 is flushed to broadcast-transfer all the received frames by the switch 420 of the STP node 100.

More specifically, while in the related art, as the number of entries in the FDB is increased, time required for flushing or rewriting the FDB is increased, that is, for example, not less than one second is required for erasing all the 10,000 or more entries which are expected to be necessary in a trunk system communication system, resulting in delaying recovery from a failure, in the present mode of implementation, the number of entries to be flushed among the entries in the port label table 490 is as many as the number of ports mounted on the STP node 100 and only a few hundreds ports are expected to be mounted per device at the most, so that flushing can be completed in a further shorter time than that required for flushing the FDB itself.

Secondly, a state where a communication band of a network is pressed due to the above-described broadcast-transfer state brought by flushing can be eliminated in a shorter time.

The reason is that since with the provision of the input port table 480 in which with one input port, two port labels are correlated in advance, a port label for use before failure occurrence and a port label for use after failure occurrence and the port label table 490 in which a relationship between the port label and an output port is registered in advance, before a failure occurs, the port label for use before failure occurrence is used for MAC address learning and after a failure occurs, an output port corresponding to the port label used before the failure occurrence is invalidated in the port label table 490 of the STP node 100, thereby changing a port label for use after failure occurrence to a port label for use in MAC address learning, the broadcast-transfer state can be eliminated only by invalidating a part of entries of the port label table and changing a port label for use in MAC address learning.

Thirdly, in failure recovery operation of the STP, recovery from a failure can be enabled in an extremely short time period without flushing the FDB.

The reason is that when the link 220 is cut off, recovery from a failure is enabled only by changing all the entries whose output ports are connected to the link 220 in the FDB 470 of the STP node 100 to have an output port not connected to the link 220.

Fourthly, such a communication system as having a plurality of VLAN (Virtual LAN) set in an Ethernet (registered trademark) network and having a spanning tree existing for each VLAN attains the above-described effects as well.

The reason is that there are provided the input port table 480 in which a port label is correlated with an input port and a VALN identifier and the FDB 470 in which a port label is correlated with a destination MAC address and a VLAN identifier.

(Second Mode of Implementation)

In the following, a second mode of implementation of the present invention will be described in detail with reference to the drawings.

(Structure of the Second Mode of Implementation)
(Structure of Communication System)

Figure 29:
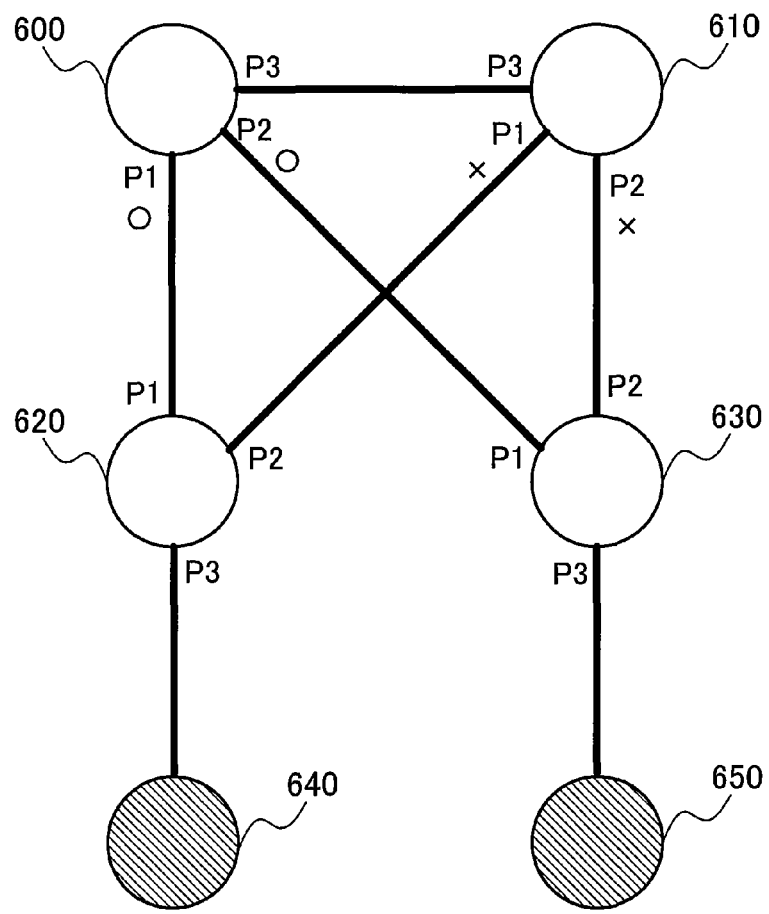
FIG. 29 is a diagram showing a structure of a communication system according to a second mode of implementation of the present invention.

FIG. 29 is a diagram showing an example of a structure of a communication system according to the second mode of implementation of the present invention.

In the communication system shown in FIG. 29, a node 600 and a node 610 are nodes duplexed by using the technique of a node duplexing protocol.

At the start of operation of the communication system, the node 600 in an operating state relays traffic between a node 620 and a node 630 and the node 610 in a waiting state shuts out traffic sent from the node 620 or the node 630 to its own node (i.e. abandons a received frame).

At this time, among the ports belonging to the node 600, ports connected to the node 620 or the node 630 under the control of the node 600 (the port P1 and the port P2) are set to be in a state where transmission/reception of a frame is allowed by the node duplexing protocol (forwarding state) and among the ports belonging to the node 610, ports connected to the node 620 or the node 630 under the control of the node 610 (the port P1 and the port P2) are set to be in a state where transmission/reception of a frame is inhibited by the node duplexing protocol (blocked state).

In addition, the node 600 and the node 610 check with each other whether they operate normally or not by the node duplexing protocol.

For example, in a case where the node 600 and the node 610 transmit a keep-alive frame to each other at fixed time intervals through a directly connected link, when a keep-alive frame fails to arrive a predetermined times in succession as shown in the communication system shown in FIG. 29, the partner node can be considered to stop its operation.

Ethernet (registered trademark) nodes 640 and 650 are accommodated in the nodes 620 and 630 as terminals under the control of the nodes 620 and 630, respectively.

Although under the nodes 620 and 630, a plurality of Ethernet (registered trademark) nodes may be accommodated, it is assumed here for the simplification of description that one Ethernet (registered trademark) node each is accommodated in the nodes 620 and 630.

Other Ethernet (registered trademark) node can be connected further under the Ethernet (registered trademark) nodes 620 and 630 unless a loop is formed.

Figure 30:
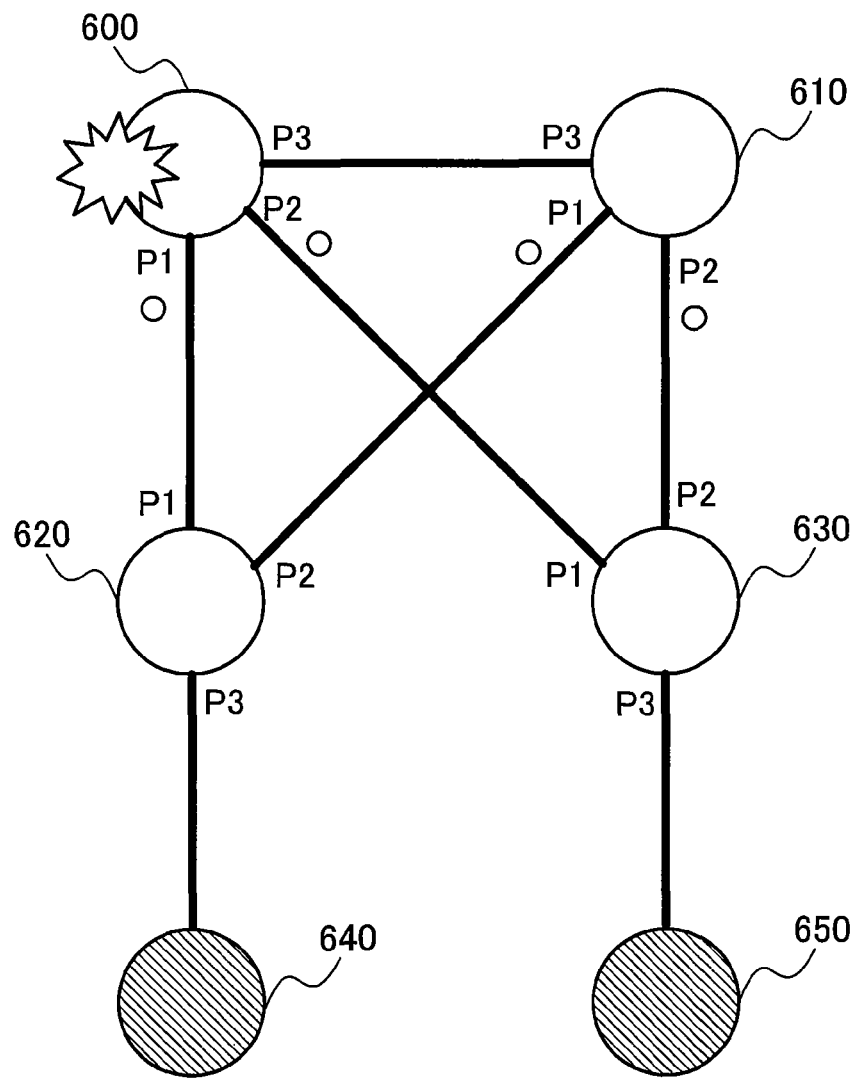
FIG. 30 is a diagram showing a state where a node 600 goes down in the communication network shown in FIG. 29.

FIG. 30 is a diagram showing a state where the node 600 goes down due to a failure in the communication system shown in FIG. 29.

When the communication system shown in FIG. 29 shifts to the communication system shown in FIG. 30 due to down of the node 600, the node 610, after detecting the node 600 going down because the number of times of non-arrival of a keep-alive frame from the node 600 reaches a predetermined number of times, changes the state of the node itself from the waiting state to the operating state and changes the port P1 and P2 of the node 610 from the blocked state to the forwarding state to start relay of traffic between the node 620 and the node 630 in place of the node 600, as well as transmitting a frame notifying that the node itself shifts to the operating state (hereinafter referred to as Flush frame) to the node 620 and the node 630.

When the nodes 620 and 630 flush their own FDB upon the reception of a flush frame as a trigger, the node 620 and the node 630 are allowed to continue communication between them.

As described in the foregoing, the communication system shown in FIG. 29 realizes a highly reliable communication system with the nodes 600 and 610 arranged upstream the network duplexed.

As is already described in the related art, however, because the nodes 620 and 630 require enormous time for flushing the FDB of their own nodes, there exists a problem that recovery of communication largely delays.

In the present mode of implementation, therefore, description will be made of a method of reducing a time required for flushing the FDB of the node 620 and the node 630 by the provision, in the node 620 and the node 630, of an FDB unit having the same function as that of the FDB unit 450 arranged in the STP node 100 according to the first mode of implementation.

(Structure of Node)

Although the structure of the node 600 and the node 610 will not be illustrated here, the following description will be made assuming that the function block realizing the functions described in the structure of the communication system is provided in the node 600 and the node 610.

Figure 31:
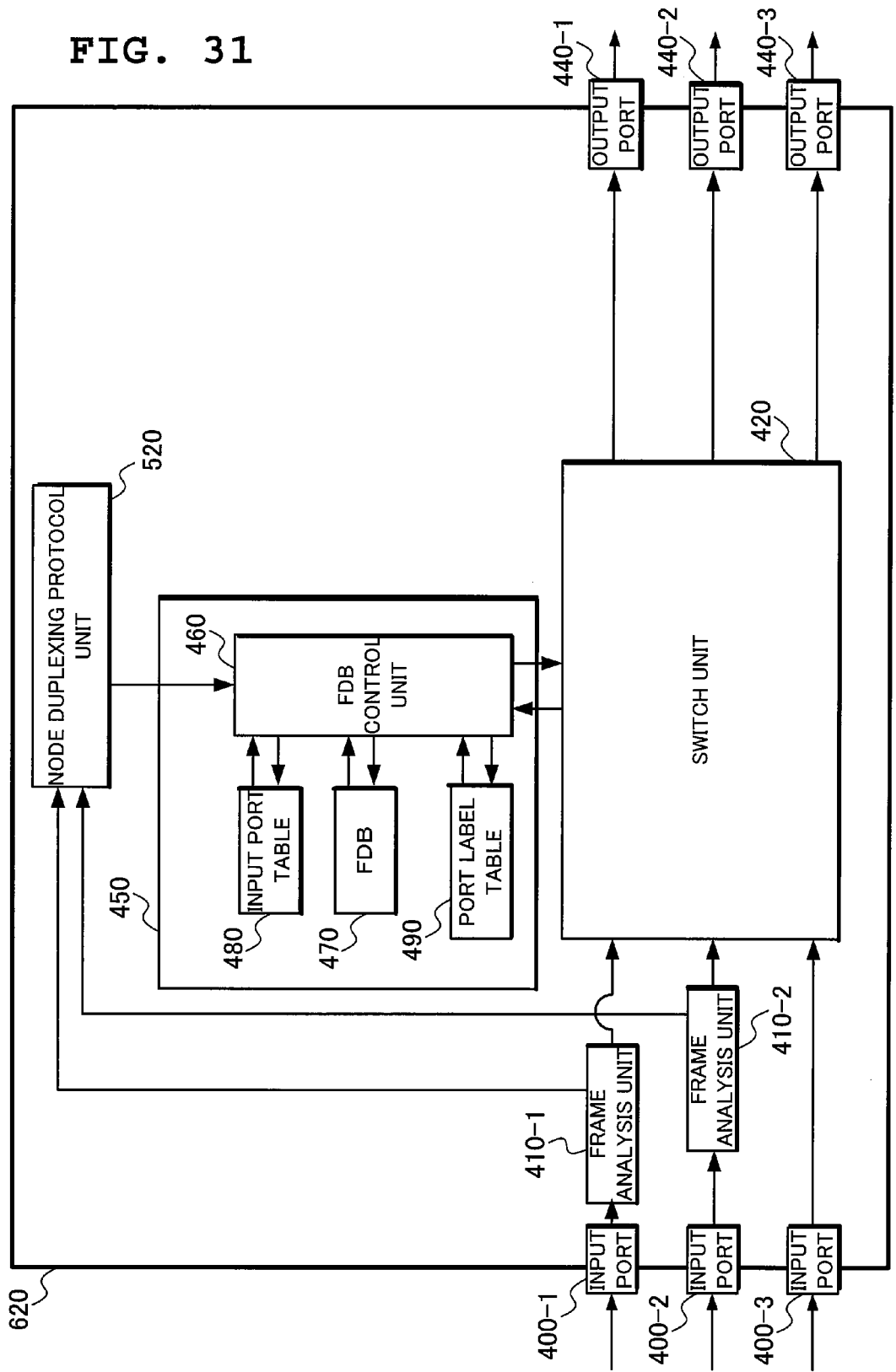
FIG. 31 is a diagram showing a structure of a node 620 according to the second mode of implementation.

FIG. 31 is a diagram showing the node 620 in the present mode of implementation.

In the following, the structure of the node 620 will be described, which is also the same as that of the node 630.

Structure of the node 620 is the same as the structure of the STP node 100 described in the first mode of implementation with the STP unit 500 of the STP node 100 replaced by a node duplexing protocol unit 520 and with the frame multiplexing units 430-1 and 430-2 and the port state table 510 deleted.

The function of the frame analysis units 410-1 and 410-2 of the node 620 differs from that of the frame analysis units 410-1 and 410-2 of the node 100 in that not BPDU but a flush frame transmitted by the node 600 or the node 610 is sent to the node duplexing protocol unit 520 of the node 620.

The function of the FDB control unit 460 of the node 620 differs from that of the FDB control unit 460 of the STP node 100 according to the first mode of implementation in flushing or rewriting the FDB 470, the input port table 480 and the port label table 490 of the node 620 in response to a request not from the STP unit 500 but from the node duplexing protocol unit 520 of the node 620.

Upon receiving a flush frame sent from the frame analysis units 410-1 and 410-2 of the node 620, the node duplexing protocol unit 520 of the node 620 requests the FDB control unit 460 of the node 620 to flush or change the FDB 470, the input port table 480 and the port label table 490 of the node 620.

Figure 32:
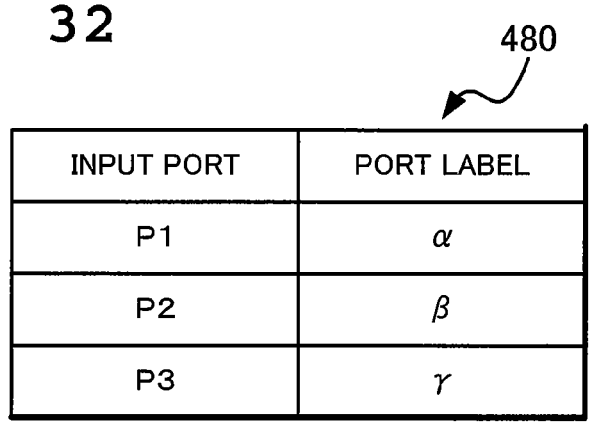
FIG. 32 is a diagram showing an input port table 480 of the node 620 according to the second mode of implementation.
Figure 33:
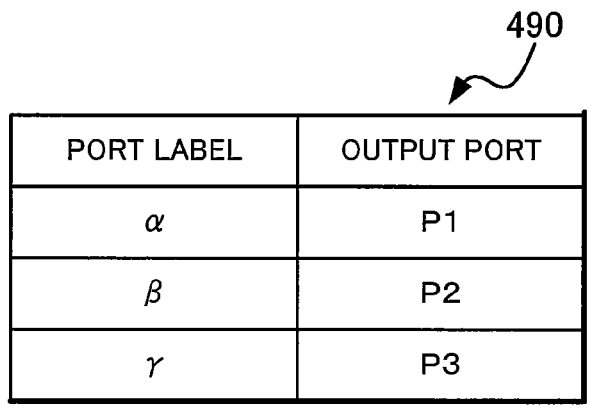
FIG. 33 is a diagram showing a port label table 490 of the node 620 according to the second mode of implementation.

FIG. 32 and FIG. 33 show examples of the input port table 480 and the port label table 490 of the node 620, respectively.

In the following, the input port table 480 and the port label table 490 of the node 620 are assumed to have the contents set as shown in FIG. 19.

(Operation of the Second Mode of Implementation)
(Operation of Frame Transfer)

Since operation of frame transfer of each node belonging to the communication system shown in FIG. 29 (broadcast-transfer of a frame, unicast-transfer of a frame and MAC address learning) is the same as the operation of the node 100 described in the first mode of implementation, no description will be made thereof.

(Operation of FDB Update at Failure Recovery)

Operation of flushing the port label table 490 and the like of the node 620 by the FDB control unit 460 of the node 620 in response to a request from the node duplexing protocol unit 520 of the node 620 when the communication system shown in FIG. 29 shifts to the state shown in FIG. 30 because of going-down of the node 600 is the same as the operation of the FDB control unit 460 of the node 100 described in the first mode of implementation.

In the second mode of implementation, however, rewriting the contents of the port label table 490 of the node 620 enables more efficient use of a communication band than by flushing the port label table 490 and the like of the node 620.

Figure 34:
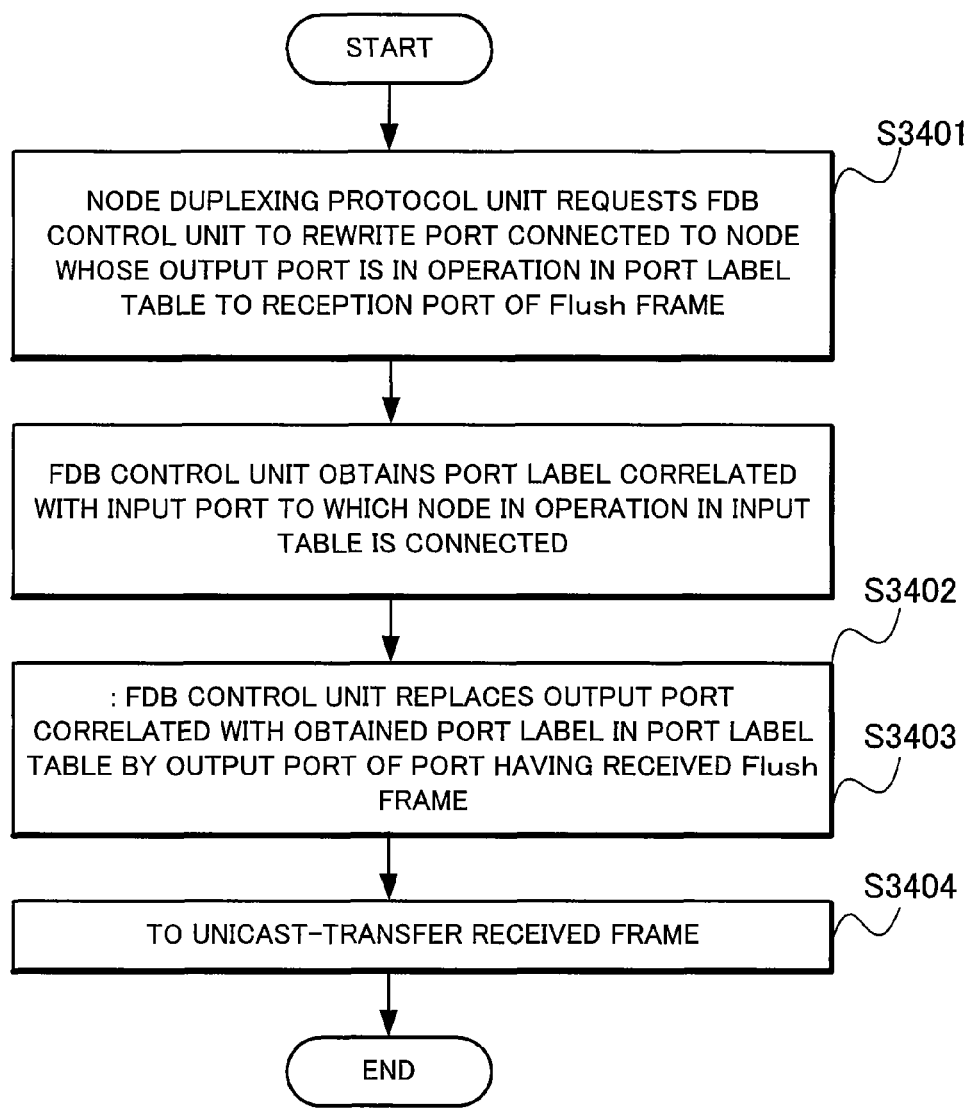
FIG. 34 is a flow chart showing operation of the node 620 according to the second mode of implementation of the present invention.

More specifically, with reference to the flow chart shown in FIG. 34, the node duplexing protocol unit 520 of the node 620 requests the FDB control unit 460 of the node 620 to rewrite, among entries in the port label table 490 of the node 620, as to an entry in which an output port is a port (the port P1 of the node 620) connected to a node in operation (node 600), the output port into a reception port (the port P2 of the node 620) of a flush frame (S3401).

At this time, after obtaining a port label a correlated with the input port P1 to which the node 600 in operation is connected in the input port table 480 of the node 620 (S3402), the FDB control unit 460 of the node 620 replaces the output port P1 correlated with the obtained port label α by the output port P2 as the port having received the flush frame in the port label table 490 of the node 620 (S3403).

In other words, the node 620 replaces the output port P1 registered for the port label a in the port label table 490 of the node 620 by the output port P2 as α port having received the flush frame.

According to the present mode of implementation, the foregoing processing causes a frame unicast-transferred from the node 620 to the node 600 to be unicast-transferred to the node 610 shifting to the operating state (S3404), so that communication between the node 620 and the node 630 is allowed to continue via the node 610.

(Effects of the Second Mode of Implementation)

Unlike a case as of after the FDB is flushed, because not all the frames are broadcast-transferred, the foregoing described present mode of implementation attains the effect of preventing pressing of a communication band of the communication system.

The reason is that at the time of a network failure, the output port P1 registered for the port label α of a port connected to a node having been in the operating state before a failure of the network is replaced by the output port P2 as a port having received a flush frame in the port label table 490.

(Third Mode of Implementation)

In the following, a third mode of implementation of the present invention will be described in detail with reference to the drawings.

In the first and second modes of implementation of the present invention, an output port is correlated with a destination MAC address of a frame through a port label.

By some network protocol, however, other information than an output port might be correlated with a destination MAC address of a frame in some cases.

In a network to which a Resilient Packet Ring (RPR) is applied which is disclosed in IEEE Standards 802.17 as a standardization document issued by IEEE in 2004 (hereinafter referred to as an RPR network), a node forming the RPR network (hereinafter referred to as an RPR node) registers at the FDB a relationship between a transmission source MAC address of an Ethernet (registered trademark) frame stored in a payload of an RPR frame and a transmission source RPR node MAC address of the RPR frame as a relationship between a destination MAC address and a destination RPR node MAC address.

In other words, in the FDB of the RPR node, a node accommodated under the RPR node belonging to the RPR network is managed.

Thus, in the RPR network, with a destination MAC address of a frame, a destination RPR node MAC address is correlated.

In the third mode of implementation of the present invention, description will be made, with respect to the RPR node as an example, of a method of flushing or changing the FDB by the node in a short time period in a communication system in which with a destination MAC address of a frame, other information than an output port is correlated.

(Structure of the Third Mode of Implementation)
(Structure of RPR Node)

The RPR node to which the present invention is applied is provided with an FDB unit 450 having the same structure as that of the FDB unit 450 arranged in the STP node 100 according to the first mode of implementation and in the node 620 according to the second mode of implementation.

The FDB unit 450 of the RPR node according to the present mode of implementation, however, is provided with an FDB 710 in which a relationship between a destination MAC address and an address label is registered in place of the FDB 470 in which a relationship between a destination MAC address and a port label is registered in the STP node 100 or the node 620.

In addition, the FDB unit 450 of the RPR node according to the present mode of implementation is provided with an RPR node address table 720 in which a relationship between an address of an RPR node forming the RPR network (hereinafter referred to as an RPR node address) and an address label is registered in place of the input port table 480 in which a relationship between an input port and a port label is registered in the STP node 100 or the node 620.

Furthermore, the FDB unit 450 of the RPR node is provided with an address label table 730 in which a relationship between an address label and a destination RPR node address is registered in place of the port label table 490 in which a relationship between a port label and an output port is registered in the STP node 100 or the node 620.

Figure 35:
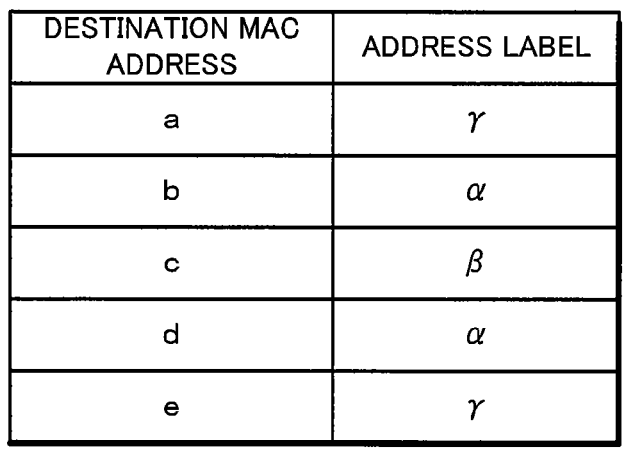
FIG. 35 is a diagram showing an FDB of an RPR node according to a third mode of implementation.

FIG. 35 through FIG. 37 show examples of the FDB 710 (FIG. 35), the RPR node address table 720 (FIG. 36) and the address label table 730 (FIG. 37) of the RPR node belonging to the RPR network formed of four RPR nodes, respectively.

(Operation of the Third Mode of Implementation)

Operation, by the FDB unit 450 of the RPR node, of registering a relationship between a transmission source MAC address of a frame stored in a payload of a received RPR frame and an address of a transmission source RPR node of the received RPR frame at the FDB 710 as a relationship between a destination MAC address and a port address (address learning), operation of notifying a destination RPR node address to the switch unit of the RPR node and operation of flushing or updating the FDB 710 of the RPR node are the same as the operation of the FDB unit 450 of the STP node 100 and the node 620 with only the difference in that an output port is changed to an RPR node address and a port label is changed to an address label.

(Effects of the Third Mode of Implementation)

Even in a communication system to which a network protocol is applied by which a destination MAC address and other information than an output port are registered at the FDB 710 such as RPR, the foregoing described present mode of implementation enables the FDB 710 to be flushed or updated in a short time period similarly to the first and second modes of implementation, thereby enabling a failure to be recovered in a short time period.

The reason is that the FDB unit 450 of the RPR node is provided with the FDB 710 in which a relationship between a destination MAC address and an address label is registered in place of the FDB 470 in which a relationship between a destination MAC address and a port label is registered, the RPR node address table 720 in which a relationship between an RPR node address and an address label is registered in place of the input port table 480 in which a relationship between an input port and a port label is registered, and the address label table 730 in which a relationship between an address label and a destination RPR node address is registered in place of the port label table 490 in which a relationship between a port label and an output port is registered, and the FDB unit registers a relationship between a transmission source MAC address of a frame stored in a payload of a received RPR frame and an address of a transmission source RPR node of the received RPR frame at the FDB 710 as a relationship between a destination MAC address and a port address, notifies a destination RPR node address to the switch unit of the RPR node, and changes an output port to an RPR node address and changes a port label to an address label to flush or update the FDB 710 of the RPR node.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Incorporation by Reference

This application is based upon and claims the benefit of priority from Japanese patent application No. 2006-016629, filed on Jan. 25, 2006, the disclosure of which is incorporated herein in its entirety by reference.

The invention claimed is:

1. A network node for transferring a frame on a network by destination address, including:
   a virtual transfer destination information table for correlating destination address of a frame and virtual transfer destination information of said frame which information is virtually defined, said destination address is classified into a number of virtual transfer destination information not more than a total number of destination addresses in said virtual transfer destination information table; and
   a transfer destination information table for correlating said virtual transfer destination information with transfer destination information; and
   wherein an entry in said transfer destination information table has a field indicative of validity of an entry,
   by obtaining virtual transfer destination information correlated with destination address of a frame in said virtual transfer destination information table and, after a failure, registering information indicating that an entry is invalid at said field indicative of validity of an entry in said transfer destination information table which entry is related to said virtual transfer destination information, abandons the correspondence between said destination address and said transfer destination information.

2. The network node according to claim 1, which transfers a received frame based on transfer destination information corresponding to said virtual transfer destination information correlated with the reception information of said frame received.

3. The network node according to claim 1, which registers transmission source information of a received frame at said virtual transfer destination information table so as to be correlated with said virtual transfer destination information correlated with the reception information of said frame received based on said reception information table.

4. The network node according to claim 3, which transfers said frame received based on transfer destination information corresponding to said virtual transfer destination information correlated with the transmission source information of said frame received.

5. A network node for transferring a frame on a network by destination address, including:
   a virtual transfer destination information table for correlating destination address of a frame and virtual transfer destination information of said frame which information is virtually defined, said destination address is classified into a number of virtual transfer destination addresses not more than a total number of destination addresses in said virtual transfer destination information table;
   a transfer destination information table for correlating said virtual transfer destination information with transfer destination information; and
   a reception information table for registering a relationship between reception information of said frame and said virtual transfer destination information,
   wherein said node which updates a relationship between destination address of a frame and virtual transfer destination information by replacing virtual transfer destination information registered at said virtual transfer destination information table by new virtual transfer destination information different from said virtual transfer destination information, and
   after abandoning a relationship between destination address of said frame and said virtual transfer destination information, said node deletes an entry in either one or both of said virtual transfer destination information table and said reception information table, which entry is related to virtual transfer destination information correlated with said transfer destination information in said transfer destination information table.

6. The network node according to claim 5, which, by erasing transfer destination information registered at said virtual transfer destination information table or replacing the information by invalid information, abandons a relationship between destination address of a frame and said transfer destination information.

7. A network node for transferring a frame on a network by destination address, including:
   a virtual transfer destination information table for correlating destination address of a frame and virtual transfer destination information of said frame which information is virtually defined, said destination address is classified into a number of virtual transfer destination information not more than a total number of destination addresses in said virtual transfer destination information table;

a transfer destination information table for correlating said virtual transfer destination information with transfer destination information; and a reception information table for registering a relationship between reception information of said frame and said virtual transfer destination information, wherein said node which obtains virtual transfer destination information correlated with transfer destination information invalid in said transfer destination information table based on a state of said network, and wherein said node replaces said virtual transfer destination information registered at said reception information table by virtual transfer destination information correlated with transfer destination information valid in said transfer destination information table unlike said virtual transfer destination information.

8. The network node according to claim 7, which registers, at said transfer destination information table, a relationship between said virtual transfer destination information as of after replacement and said reception information in said reception information table as a relationship between virtual transfer destination information and transfer destination information.

9. The network node according to claim 1, wherein in said reception information table, a plurality of kinds of virtual transfer destination information are correlated with one reception information.

10. The network node according to claim 9, which registers, at said virtual transfer destination information table, a relationship between transmission source information of a received frame and one virtual transfer destination information selected based on a state of the network node itself from among a plurality of kinds of virtual transfer destination information correlated with reception information of said frame in said reception information table as a relationship between destination address of the frame and virtual transfer destination information.

11. The network node according to claim 1, wherein said transfer destination information is any one identifier of an output destination information identifier, a network node identifier, a VLAN identifier and a communication path identifier.

12. The network node according to claim 1, wherein reception information of said frame is any one of an output destination information identifier, a network node identifier, a VLAN identifier and a communication path identifier, or information formed by arbitrarily combining said identifiers.

13. The network node according to claim 1, wherein said virtual transfer destination information is an address indicating a storage region in which output destination information correlated with said virtual output destination information in a storage device is stored in which device said output destination information table is stored.

14. A non-transitory computer-readable storage medium storing a frame transfer program executed on a network node for transferring a frame on a network by destination address, said frame transfer program causes said network node to execute the functions of:

a function of using a virtual transfer destination information table for correlating destination address of a frame and virtual transfer destination information of said frame which information is virtually defined, said destination address is classified into a number of virtual transfer destination information not more than a total number of destination addresses in said virtual transfer destination information table;

a function of using a transfer destination information table for correlating said virtual transfer destination information with transfer destination information;

a function of changing a relationship between the destination address of said frame and said transfer destination information by updating or abandoning a relationship between the virtual transfer destination information of said frame and said destination address in said virtual transfer destination information table based on a state of said network to transfer a received frame, and a function of transferring a received frame according to transfer destination information corresponding to said virtual transfer destination information correlated with reception information of said frame received based on said table and a reception information table which registers a relationship between the reception information of said frame and said virtual transfer destination information, wherein said frame transfer program causes said network node to have the functions of:

updating a relationship between destination address of a frame and virtual transfer destination information by replacing destination address registered at said virtual transfer destination information table by new destination address different from said destination address, and transferring a received frame based on transfer destination information after said replacement.

15. The non-transitory computer-readable storage medium according to claim 14, said frame transfer program causes said network node to have the functions of:

registering transmission source information of a received frame at said virtual transfer destination information table so as to be correlated with said virtual transfer destination information correlated with the reception information of said frame received based on said reception information table, and transferring said frame received based on transfer destination information corresponding to said virtual transfer destination information correlated with the transmission source information of said frame received.

16. The non-transitory computer-readable storage medium according to claim 14, said frame transfer program causes said network node to have the functions of:

obtaining said virtual transfer destination information correlated with destination address of a received frame based on said virtual transfer destination information table, and transferring said frame received based on said transfer destination information correlated with said virtual transfer destination information in said transfer destination information table.

17. The non-transitory computer-readable storage medium according to claim 14, said frame transfer program causes said network node to have the function of:

when virtual transfer destination information correlated with destination address of a received frame is obtained based on said virtual transfer destination information table to find that transfer destination information correlated with said virtual transfer destination information in said transfer destination information table indicates transfer invalid, or when an entry in said virtual transfer destination information table which entry is related to the destination address of said frame received is invalid, or when virtual transfer destination information correlated with destination address of a received frame is obtained based on said virtual transfer destination information table to find that an entry in said transfer destination information table which entry is related to said virtual transfer destination information obtained is invalid, broadcast-transferring said frame received.

18. A non-transitory computer-readable storage medium storing a frame transfer program executed on a network node for transferring a frame on a network by destination address, said frame transfer program causes said network node to execute the functions of:
a function of using a virtual transfer destination information table for correlating destination address of a frame and virtual transfer destination information of said frame which information is virtually defined, said destination address is classified into a number of virtual transfer destination information not more than a total number of destination addresses in said virtual transfer destination information table;
a function of using a transfer destination information table for correlating said virtual transfer destination information with transfer destination information;
a function of changing a relationship between the destination address of said frame and said transfer destination information by updating or abandoning a relationship between the virtual transfer destination information of said frame and said destination address in said virtual transfer destination information table based on a state of said network to transfer a received frame, and
a function of transferring a received frame according to transfer destination information corresponding to said virtual transfer destination information correlated with reception information of said frame received based on said table and a reception information table which registers a relationship between the reception information of said frame and said virtual transfer destination information,
wherein said frame transfer program causes said network node to have the function of:
by erasing transfer destination information registered at said virtual transfer destination information table or replacing the information by invalid information, abandoning a relationship between destination address of a frame and said transfer destination information to broadcast a received frame.

19. A non-transitory computer-readable storage medium storing a frame transfer program executed on a network node for transferring a frame on a network by destination address, said frame transfer program causes said network node to execute the functions of:
a function of using a virtual transfer destination information table for correlating destination address of a frame and virtual transfer destination information of said frame which information is virtually defined, said destination address is classified into a number of virtual transfer destination information not more than a total number of destination addresses in the virtual transfer destination information table;
a function of using a transfer destination information table for correlating said virtual transfer destination information with transfer destination information;
a function of changing a relationship between the destination address of said frame and said transfer destination information by updating or abandoning a relationship between the virtual transfer destination information of said frame and said destination address in said virtual transfer destination information table based on a state of said network to transfer a received frame, and
a function of transferring a received frame according to transfer destination information corresponding to said virtual transfer destination information correlated with reception information of said frame received based on said table and a reception information table which registers a relationship between the reception information of said frame and said virtual transfer destination information,
wherein said frame transfer program causes said network node to have the function of:
by obtaining virtual transfer destination information correlated with destination address of a frame in said virtual transfer destination information table and registering information indicating that an entry is invalid at a field indicative of validity of an entry in said transfer destination information table which entry is related to said virtual transfer destination information, abandoning a relationship between said destination address and said transfer destination information and transferring a frame having said destination address based on transfer destination information other than said transfer destination information.

20. A non-transitory computer-readable storage medium storing a frame transfer program executed on a network node for transferring a frame on a network by destination address, said frame transfer program causes said network node to execute the functions of:
a function of using a virtual transfer destination information table for correlating destination address of a frame and virtual transfer destination information of said frame which information is virtually defined, said destination address is classified into a number of virtual transfer destination information not more than a total number of destination addresses in said virtual transfer destination information table;
a function of using a transfer destination information table for correlating said virtual transfer destination information with transfer destination information;
a function of changing a relationship between the destination address of said frame and said transfer destination information by updating or abandoning a relationship between the virtual transfer destination information of said frame and said destination address in said virtual transfer destination information table based on a state of said network to transfer a received frame, and
a function of transferring a received frame according to transfer destination information corresponding to said virtual transfer destination information correlated with reception information of said frame received based on said table and a reception information table which registers a relationship between the reception information of said frame and said virtual transfer destination information,
wherein said frame transfer program causes said network node to have the functions of:
obtaining virtual transfer destination information correlated with destination address invalid in said virtual transfer destination information table based on a state of said network,
replacing said virtual transfer destination information registered at said reception information table by virtual transfer destination information correlated with destination address valid in said transfer destination information table unlike said virtual transfer destination information, and transferring a received frame based on said destination address valid which is correlated with the virtual transfer destination information after said replacement.

21. A frame transfer method in which a network node transfers a frame on a network by destination address, including the steps of:
using a virtual transfer destination information table for correlating destination address of a frame and virtual transfer destination information of said frame which information is virtually defined, said destination address is classified into a number of virtual transfer destination information not more than a total number of destination addresses in said virtual transfer destination information table;
using a transfer destination information table for correlating said virtual transfer destination information and said transfer destination information; and
changing a relationship between the destination address of said frame and said transfer destination information by updating or abandoning a relationship between the virtual transfer destination information of said frame and said destination address in said virtual transfer destination information table based on a state of said network to transfer a received frame,
wherein at said transfer step, a received frame is transferred according to transfer destination information corresponding to said virtual transfer destination information correlated with reception information of said frame received based on said table and a reception information table which registers a relationship between the reception information of said frame and said virtual transfer destination information.

22. The frame transfer method according to claim 21, comprising the step of:
registering transmission source information of a received frame at said virtual transfer destination information table so as to be correlated with said virtual transfer destination information correlated with the reception information of said frame received based on said reception information table, wherein
at said transfer step, said frame received is transferred based on transfer destination information corresponding to said virtual transfer destination information correlated with the transmission source information of said frame received.

23. The frame transfer method according to claim 21, comprising the step of:
obtaining said virtual transfer destination information correlated with destination address of a received frame based on said virtual transfer destination information table, wherein
at said transfer step, said frame received is transferred based on said transfer destination information correlated with said virtual transfer destination information in said transfer destination information table.

24. The frame transfer method according to claim 21, wherein
when virtual transfer destination information correlated with destination address of a received frame is obtained based on said virtual transfer destination information table to find that transfer destination information correlated with said virtual transfer destination information in said transfer destination information table indicates transfer invalid, or
when an entry in said virtual transfer destination information table which entry is related to the destination address of said frame received is invalid, or when virtual transfer destination information correlated with destination address of a received frame is obtained based on said virtual transfer destination information table to find that an entry in said transfer destination information table which entry is related to said virtual transfer destination information obtained is invalid,
at said transfer step, said frame received is broadcast-transferred.

25. The frame transfer method according to claim 21, comprising the step of:
updating a relationship between destination address of a frame and transfer destination information by replacing transfer destination information registered at said transfer destination information table by transfer destination information different from said transfer destination information, wherein said transfer step has the step of
transferring a received frame based on transfer destination information as of after replacement.

26. The frame transfer method according to claim 21, wherein at said transfer step
by erasing transfer destination information registered at said transfer destination information table or replacing the information by invalid information, a relationship is abandoned between destination address of a frame and said transfer destination information to broadcast a received frame.

27. The frame transfer method according to claim 21, wherein at said transfer step
by obtaining virtual transfer destination information correlated with destination address of a frame in said virtual transfer destination information table and registering information indicating that an entry is invalid at a field indicative of validity of an entry in said transfer destination information table which entry is related to said virtual transfer destination information, a relationship between said destination address and said transfer destination information is abandoned to transfer a frame having said destination address based on transfer destination information other than said transfer destination information.

28. The frame transfer method according to claim 21, comprising the steps of:
obtaining virtual transfer destination information correlated with transfer destination information invalid in said transfer destination information table based on a state of said network, and
replacing said virtual transfer destination information registered at said reception information table by virtual transfer destination information correlated with transfer destination information valid in said transfer destination information table unlike said virtual transfer destination information, wherein at said transfer step
a received frame is transferred based on said transfer destination information valid which is correlated with the virtual transfer destination information as of after replacement.

29. The network node according to claim 1, which transfers a received frame based on transfer destination information corresponding to said virtual transfer destination information correlated with the reception information of said frame received.

30. The network node according to claim 1, which updates a relationship between destination address of a frame and transfer destination information by replacing transfer destination information registered at said transfer destination information table by transfer destination information different from said transfer destination information.

31. The network node according to claim 1, which, by erasing transfer destination information registered at said transfer destination information table or replacing the information by invalid information, abandons a relationship between destination address of a frame and said transfer destination information.

32. The network node according to claim 1, wherein an entry in said transfer destination information table has a field indicative of validity of an entry.

33. The network node according to claim 1, which
obtains virtual transfer destination information correlated with transfer destination information invalid in said transfer destination information table based on a state of said network, and
replaces said virtual transfer destination information registered at said reception information table by virtual transfer destination information correlated with transfer destination information valid in said transfer destination information table unlike said virtual transfer destination information.

34. The network node according to claim 5, wherein in said reception information table, a plurality of kinds of virtual transfer destination information are correlated with one reception information.

35. The network node according to claim 5, wherein said transfer destination information is any one identifier of an output destination information identifier, a network node identifier, a VLAN identifier and a communication path identifier.

36. The network node according to claim 5, wherein reception information of said frame is any one of an output destination information identifier, a network node identifier, a VLAN identifier and a communication path identifier, or information formed by arbitrarily combining said identifiers.

37. The network node according to claim 5, wherein said virtual transfer destination information is an address indicating a storage region in which output destination information correlated with said virtual output destination information in a storage device is stored in which device said output destination information table is stored.

38. The network node according to claim 1, which transfers a frame having said destination address based on transfer destination information other than said transfer destination information.

39. The network node according to claim 1, including a reception information table for registering a relationship between reception information of said frame and said virtual transfer destination information.

* * * * *

UNITED STATES PATENT AND TRADEMARK OFFICE
CERTIFICATE OF CORRECTION

PATENT NO. : 8,401,008 B2
APPLICATION NO. : 12/162074
DATED : March 19, 2013
INVENTOR(S) : Ogasahara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this
First Day of September, 2015

Michelle K. Lee
*Director of the United States Patent and Trademark Office*